US012731608B2

(12) United States Patent
Kikuchi et al.

(10) Patent No.: US 12,731,608 B2
(45) Date of Patent: Sep. 8, 2026

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventors: Wataru Kikuchi, Minamiashigara (JP); Yutaka Nozoe, Minamiashigara (JP); Nobuhito Onozuka, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/820,883

(22) Filed: Aug. 30, 2024

(65) Prior Publication Data

US 2025/0078869 A1 Mar. 6, 2025

(30) Foreign Application Priority Data

Aug. 31, 2023 (JP) ................................. 2023-140627

(51) Int. Cl.
*G11B 5/725* (2006.01)
*G11B 5/008* (2006.01)

(52) U.S. Cl.
CPC .......... *G11B 5/725* (2013.01); *G11B 5/00813* (2013.01)

(58) Field of Classification Search
CPC ............................ G11B 5/00813; G11B 5/725
See application file for complete search history.

(56) References Cited

U.S. PATENT DOCUMENTS 4,469,751 A * 9/1984 Kobayashi ............... G11B 5/71 360/134
2008/0075981 A1 3/2008 Matsuo et al.
2020/0312359 A1 * 10/2020 Naoi .................. G11B 5/70642

FOREIGN PATENT DOCUMENTS

JP 10-261220 A 9/1998
JP 4070147 B1 1/2008

OTHER PUBLICATIONS

English Machine Translation: Mukai (JP 2003-067995).*
English Machine Translation: JP H06-150297.*

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium includes a silicon-containing compound having a partial structure represented by Formula 1 (hereinafter, also simply referred to as a "silicon-containing compound") in a portion on a non-magnetic support on a magnetic layer side. In Formula 1, $R^{11}$, $R^{12}$, and $R^{13}$ each independently represent a monovalent substituent, $L^{11}$ represents an (n+1)-valent linking group, n represents an integer of 2 or more, and * represents a position at which the partial structure represented by Formula 1 is bonded to another partial structure constituting the silicon-containing compound.

(Formula 1)

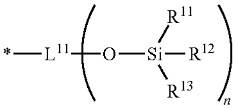

19 Claims, No Drawings

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application claims priority under 35 U.S.C 119 to Japanese Patent Application No. 2023-140627 filed on Aug. 31, 2023. The above application is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

The magnetic recording medium is generally manufactured by forming a magnetic layer containing a ferromagnetic powder on a non-magnetic support (for example, see JP4070147B and JP1998-261220A (JP10-261220A)).

SUMMARY OF THE INVENTION

Recording of data on the magnetic recording medium and reproducing of recorded data are usually performed as the magnetic recording medium is run in the magnetic recording and reproducing device and a magnetic layer surface of the magnetic recording medium and a magnetic head come into contact with each other to be slid on each other. It is desirable that a friction coefficient in a case of sliding between the magnetic layer surface and the magnetic head is low even after repeating the running of the magnetic recording medium, from the viewpoint of running stability.

An object of an aspect of the present invention is to provide a magnetic recording medium capable of exhibiting a low friction coefficient after repeated running.

JP4070147B and JP1998-261220A (JP10-261220A) disclose that a silicon (Si)-containing compound is added to the magnetic layer (see, for example, claim 1 and the like of each of JP4070147B and JP1998-261220A (JP10-261220A)). With respect to this, the present inventor has conducted intensive studies to provide a magnetic recording medium capable of exhibiting a low friction coefficient even after repeated running. As a result, the present inventor has newly found that a magnetic recording medium including, in a portion (details will be described below) on a non-magnetic support on a magnetic layer side, a silicon-containing compound having a branched structure in which two or more monovalent substituents represented by "—O—$SiR^{11}R^{12}R^{13}$" are bonded to a linking group $L^{11}$ is capable of exhibiting a low friction coefficient after repeated running.

That is, one aspect of the present invention is as follows.

[1]A magnetic recording medium comprising:

a non-magnetic support; and a magnetic layer containing a ferromagnetic powder, in which a silicon-containing compound having a partial structure represented by Formula 1 (hereinafter, also simply referred to as a "silicon-containing compound") is included in a portion on the non-magnetic support on a magnetic layer side, in Formula 1, $R^{11}$, $R^{12}$, and $R^{13}$ each independently represent a monovalent substituent, $L^{11}$ represents an (n+1)-valent linking group, n represents an integer of 2 or more, and * represents a position at which the partial structure represented by Formula 1 is bonded to another partial structure constituting the silicon-containing compound.

(Formula 1)

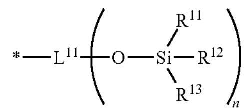

[2] The magnetic recording medium according to [1], in which the silicon-containing compound is a polymer having a constitutional unit represented by Formula 2, in Formula 2, $R^{21}$ and $R^{22}$ each independently represent a hydrogen atom or an alkyl group, $R^{23}$ represents a hydrogen atom or a monovalent substituent, $L^{12}$ represents a single bond or a divalent linking group, *represents a position at which the constitutional unit represented by Formula 2 is bonded to another partial structure constituting the silicon-containing compound, and $R^{11}$, $R^{12}$, $R^{13}$, $L^{11}$, and n are respectively synonymous with $R^{11}$, $R^{12}$, $R^{13}$, $L^{11}$, and n in Formula 1.

(Formula 2)

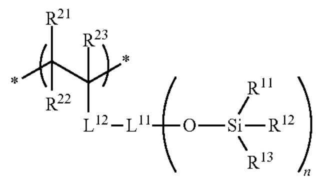

[3] The magnetic recording medium according to [2], in which, in Formula 2, $R^{21}$ and $R^{22}$ represent a hydrogen atom, and $R^{23}$ represents a hydrogen atom or a methyl group.

[4] The magnetic recording medium according to [2] or [3], in which the constitutional unit represented by Formula 2 is a constitutional unit represented by Formula 3, in Formula 3, $R^{23}$ represents a hydrogen atom or a methyl group,*represents a position at which the constitutional unit represented by Formula 3 is bonded to another partial structure constituting the silicon-containing compound, and $R^{11}$, $R^{12}$, $R^{13}$, $L^{11}$, and n are respectively synonymous with $R^{11}$, $R^{12}$, $R^{13}$, $L^{11}$, and n in Formula 1.

(Formula 3)

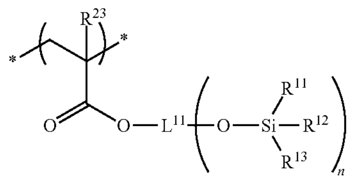

[5] The magnetic recording medium according to any one of [2] to [4], in which the polymer includes at least one selected from the group consisting of a carboxy group, an amino group, a hydroxy group, a sulfo group, a phosphonoxy group, and salts thereof, an alkyl group, a glycol structure, an ester structure, an amide structure, an anionic structure, and an amphoteric structure.

[6] The magnetic recording medium according to any one of [2] to [4], in which the polymer includes at least one selected from the group consisting of a carboxy group, an amino group, a hydroxy group, a sulfo group, a phosphonoxy group, and salts thereof, an alkyl group, and a glycol structure.

[7] The magnetic recording medium according to any one of [2] to [4], in which the polymer includes at least one selected from the group consisting of a carboxy group, an amino group, a hydroxy group, a sulfo group, a phosphonoxy group, and salts thereof, an ester structure, and an amide structure.

[8] The magnetic recording medium according to any one of [2] to [7], in which a weight-average molecular weight of the polymer is 2000 or more and less than 200000.

[9] The magnetic recording medium according to [4], in which the polymer includes at least one selected from the group consisting of a carboxy group, an amino group, a hydroxy group, a sulfo group, a phosphonoxy group, and salts thereof, an ester structure, and an amide structure, and a weight-average molecular weight of the polymer is 2000 or more and less than 200000.

[10] The magnetic recording medium according to [1], in which the silicon-containing compound is a nitrogen-containing polymer.

[11] The magnetic recording medium according to [10], in which the nitrogen-containing polymer is a polyalkyleneimine-based polymer.

[12] The magnetic recording medium according to [10] or [11], in which the nitrogen-containing polymer has a polyester chain.

[13] The magnetic recording medium according to any one of [10] to [12], in which a weight-average molecular weight of the nitrogen-containing polymer is 4000 or more and less than 20000.

[14] The magnetic recording medium according to [10], in which the nitrogen-containing polymer is a polyalkyleneimine-based polymer, the polyalkyleneimine-based polymer has a polyester chain, and a weight-average molecular weight of the polyalkyleneimine-based polymer is 4000 or more and less than 20000.

[15] The magnetic recording medium according to any one of [1] to [14], in which a contact angle with water, which is measured on a surface of the magnetic layer, is 900 or more.

[16] The magnetic recording medium according to any one of [1] to [15], in which the portion on the non-magnetic support on the magnetic layer side further includes one or more fatty acid compounds selected from the group consisting of a fatty acid, a fatty acid ester, and a fatty acid amide.

[17] The magnetic recording medium according to any one of [1] to [16], further comprising:

a non-magnetic layer containing a non-magnetic powder between the non-magnetic support and the magnetic layer.

[18] The magnetic recording medium according to any one of [1] to [17], further comprising:

a back coating layer containing a non-magnetic powder on a surface side of the non-magnetic support opposite to a surface side having the magnetic layer.

[19] The magnetic recording medium according to any one of [1] to [18], in which the magnetic recording medium is a magnetic tape.

[20] The magnetic recording medium according to [9], in which a contact angle with water, which is measured on a surface of the magnetic layer, is 900 or more, the portion on the non-magnetic support on the magnetic layer side further includes one or more fatty acid compounds selected from the group consisting of a fatty acid, a fatty acid ester, and a fatty acid amide, the magnetic recording medium further includes a non-magnetic layer containing a non-magnetic powder between the non-magnetic support and the magnetic layer, and a back coating layer containing a non-magnetic powder on a surface side of the non-magnetic support opposite to a surface side having the magnetic layer, and the magnetic recording medium is a magnetic tape.

[21] The magnetic recording medium according to [14], in which a contact angle with water, which is measured on a surface of the magnetic layer, is 90° or more, the portion on the non-magnetic support on the magnetic layer side further includes one or more fatty acid compounds selected from the group consisting of a fatty acid, a fatty acid ester, and a fatty acid amide, the magnetic recording medium further includes a non-magnetic layer containing a non-magnetic powder between the non-magnetic support and the magnetic layer, and a back coating layer containing a non-magnetic powder on a surface side of the non-magnetic support opposite to a surface side having the magnetic layer, and the magnetic recording medium is a magnetic tape.

[22]A magnetic tape cartridge comprising:

the magnetic tape according to any one of [19] to [21].

[23]A magnetic recording and reproducing device comprising: the magnetic recording medium according to any one of [1] to [21].

According to an aspect of the present invention, it is possible to provide a magnetic recording medium capable of exhibiting a low friction coefficient after repeated running. In addition, according to an aspect of the present invention, it is possible to provide a magnetic tape cartridge and a magnetic recording and reproducing device including the magnetic recording medium.

DESCRIPTION OF THE PREFERRED EMBODIMENTS

Magnetic Recording Medium

One aspect of the present invention relates to a magnetic recording medium including a non-magnetic support, and a magnetic layer containing a ferromagnetic powder. The magnetic recording medium includes a silicon-containing compound having a partial structure represented by Formula 1 in a portion on the non-magnetic support on a magnetic layer side.

In the present invention and the present specification, the term "portion on the non-magnetic support on the magnetic layer side" refers to a magnetic layer in a case of a magnetic recording medium including the magnetic layer directly on the non-magnetic support, and refers to a magnetic layer and/or a non-magnetic layer in a case of a magnetic recording medium including the non-magnetic layer between the non-magnetic support and the magnetic layer, which will be described below. The term "portion on the non-magnetic support on the magnetic layer side" is also simply described as a "portion on the magnetic layer side". The presence of a certain component on the surface of the magnetic recording medium on the magnetic layer side is also included in the inclusion of the component in the portion on the magnetic layer side.

The magnetic recording medium includes a silicon-containing compound having a partial structure represented by Formula 1 in a portion on a magnetic layer side. It is considered that the silicon-containing compound can function as a lubricant of the magnetic recording medium. The present inventor considers that the above-described silicon-containing compound can play a role of imparting lubricity to a magnetic layer surface by functioning as the lubricant of the magnetic recording medium, and can contribute to the fact that the magnetic recording medium can exhibit a low friction coefficient after repeated running. For example, it is considered that at least a part of the silicon-containing compound included in the magnetic layer can be present on the magnetic layer surface. In addition, the present inventor supposes that the silicon-containing compound included in the magnetic layer can be present on the magnetic layer surface by moving to the magnetic layer surface during sliding on the magnetic head. In addition, it is considered that the non-magnetic layer which will be described below may include the silicon-containing compound, and the silicon-containing compound included in the non-magnetic layer can move to the magnetic layer and further move to the magnetic layer surface to be present on the magnetic layer surface.

Further, the present inventor considers that the magnetic recording medium including the silicon-containing compound having the partial structure represented by Formula 1 in the portion on the magnetic layer side can also contribute to reducing a change in surface shape of the magnetic layer before and after repeated running. It is desirable that the change in surface shape of the magnetic layer before and after repeated running is small from the viewpoint of suppressing deterioration in performance of the magnetic recording medium after repeated running.

Note that the above description is supposition and does not limit the present invention. In addition, the present invention is not limited to other supposition described in the present specification.

Hereinafter, the magnetic recording medium will be further described in detail.

Silicon-Containing Compound

The silicon-containing compound includes a silicon-containing compound having a partial structure represented by Formula 1. The present inventor supposes that the fact that that the presence of silicon-containing branched structure in which two or more monovalent substituents represented by "—O—Si$R^{11}R^{12}R^{13}$" are bonded to a linking group $L^{11}$ contributes to the fact that the magnetic recording medium including the silicon-containing compound in the portion on the magnetic layer side can exhibit a low friction coefficient after repeated running, and also contributes to reducing the change in surface shape of the magnetic layer before and after repeated running. In one aspect, the silicon-containing compound may be a compound which does not contain a fluorine atom as an atom constituting the compound.

(Formula 1)

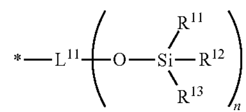

Hereinafter, the above silicon-containing compound will be described in more detail. In the present invention and the present specification, unless otherwise noted, the groups described may have a substituent or may be unsubstituted. In a case where a certain group has a substituent, examples of the substituent include an alkyl group (for example, an alkyl group having 1 to 6 carbon atoms), a hydroxy group, an alkoxy group (for example, an alkoxy group having 1 to 6 carbon atoms), a cyano group, an amino group, a nitro group, an acyl group, and a carboxy group. IN addition, regarding a group having a substituent, the term "carbon atoms" means carbon atoms in a portion not including the substituent. In addition, in the present invention and the present specification, unless otherwise noted, each of the "alkyl group", "alkylene group", "alkenyl group", and "hydrocarbon group" includes a linear, branched, or cyclic form of each group.

In Formula 1, $R^{11}$, $R^{12}$, and $R^{13}$ each independently represent a monovalent substituent, $L^{11}$ represents an (n+1)-valent linking group, n represents an integer of 2 or more, and * represents a position at which the partial structure represented by Formula 1 is bonded to another partial structure constituting the silicon-containing compound. In the present invention and the present specification,*represents a position at which partial structures are bonded to each other, and*may be omitted.

In Formula 1, $R^{11}$, $R^{12}$, and $R^{13}$ may be the same as or different from each other. In addition, two or more $R^{11}$'s present in Formula 1 may be the same as or different from each other. The same applies to $R^{12}$ and $R^{13}$.

$R^{11}$, $R^{12}$, and $R^{13}$ can each independently represent an alkyl group, an alkenyl group, an aryl group, or an alkylene aryl group, and are preferably an alkyl group or an aryl group.

Examples of the alkyl group include a linear alkyl group having 1 to 18 carbon atoms, a branched alkyl group having 3 to 18 carbon atoms, and a cyclic alkyl group having 3 to 18 carbon atoms. Specific examples of the alkyl group include a methyl group, an ethyl group, a propyl group, a butyl group, an isopropyl group, a tertiary (tert)-butyl group, and a cyclohexyl group.

Examples of the alkenyl group include an alkenyl group having 2 to 12 carbon atoms. Specific examples of the alkenyl group include a vinyl group, a 1-propenyl group, a 1-butenyl group, a 1-methyl-1-propenyl group, a 1-cyclopentenyl group, and a 1-cyclohexenyl group.

Examples of the aryl group include an aryl group having 6 to 12 carbon atoms. Specific examples of the aryl group include a phenyl group, an α-methylphenyl group, and a naphthyl group.

Examples of the alkylene aryl group include an alkylene aryl group having 7 to 30 carbon atoms.

In Formula 1, $R^{11}$, $R^{12}$, and $R^{13}$ are each independently preferably an alkyl group, more preferably all the same alkyl group, still more preferably all the same alkyl group having 1 to 4 carbon atoms, and still more preferably all methyl groups.

In Formula 1, n represents an integer of 2 or more, and preferably represents an integer of 3 or more. n may be, for example, 12 or less, and may be 11 or less, 10 or less, 9 or less, 8 or less, 7 or less, 6 or less, 5 or less, or 4 or less.

In Formula 1, examples of the (n+1)-valent linking group represented by $L^{11}$ include a linear or branched hydrocarbon group having 1 to 10 carbon atoms, which is (n+1)-valent, and a hydrocarbon group in which a part of carbon atoms constituting a linear or branched hydrocarbon group, which is (n+1)-valent, is substituted with a heteroatom. Examples of the heteroatom substituting a part of carbon atoms include a silicon atom, an oxygen atom, and a nitrogen atom, and among these, a silicon atom or an oxygen atom is preferable, and a silicon atom is more preferable. In addition, the hydrocarbon group can be a saturated hydrocarbon group or an unsaturated hydrocarbon group, and is preferably a saturated hydrocarbon group.

In one aspect, the (n+1)-valent linking group represented by $L^{11}$ can be a linear or branched alkylene group having 1 to 10 carbon atoms, or can be a substituted alkylene group in which a part of carbon atoms constituting a linear or branched alkylene group having 1 to 10 carbon atoms is substituted with a heteroatom. For example, $L^{11}$ can be a tetravalent linking group in which a silicon atom is bonded to a terminal of a linear alkylene group having 1 to 10 carbon atoms. In a case of having such $L^{11}$, the partial structure represented by Formula 1 can be represented by Formula 1-1. In Formula 1-1, m represents an integer of 1 or more and 10 or less. m may be 9 or less, 8 or less, 7 or less, 6 or less, 5 or less, or 4 or less. $R^{41}$, $R^{42}$, and $R^{43}$; $R^{51}$, $R^{52}$, and $R^{53}$; and $R^{61}$. $R^{62}$, and $R^{63}$ have the same meaning as $R^{11}$, $R^{12}$, and $R^{13}$ in Formula 1, and the details thereof are as described above.*in Formula 1-1 is the same as*in Formula 1.

(Formula 1-1)

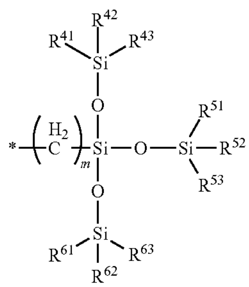

The magnetic recording medium may include only one kind of the silicon-containing compound in the portion on the magnetic layer side, or may contain two or more kinds of the silicon-containing compounds having different structures. In one aspect, the silicon-containing compound can be a polymer having a constitutional unit represented by Formula 2, and in another aspect, the silicon-containing compound can be a nitrogen-containing polymer. In the present invention and the present specification, the term "polymer" includes a homopolymer and a copolymer.

Hereinafter, each of the above polymers will be described in more detail.

(1) Polymer Having Constitutional Unit Represented by Formula 2

In one aspect, the silicon-containing compound may be a polymer having a constitutional unit represented by Formula 2.

(Formula 2)

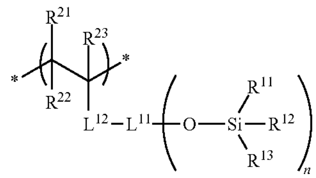

In Formula 2, $R^{21}$ and $R^{22}$ each independently represent a hydrogen atom or an alkyl group, and $R^{23}$ represents a hydrogen atom or a monovalent substituent.

In one aspect, both $R^{21}$ and $R^{22}$ represent a hydrogen atom, and in another aspect, one of $R^{21}$ and $R^{22}$ represents a hydrogen atom and the other represents an alkyl group. In addition, in another aspect, $R^{21}$ and $R^{22}$ represent the same or different alkyl groups. With regard to the alkyl group represented by $R^{21}$ and/or $R^{22}$, the above description regarding the alkyl group represented by $R^{11}$, $R^{12}$, and/or $R^{13}$ can be referred to.

In Formula 2, $R^{23}$ represents a hydrogen atom or a monovalent substituent. Examples of the monovalent substituent represented by $R^{23}$ include an alkyl group. With regard to such an alkyl group, the above description regarding the alkyl group represented by $R^{11}$, $R^{12}$, and/or $R^{13}$ can be referred to.

In one aspect, in Formula 2, $R^{21}$ and $R^{22}$ represent a hydrogen atom, and $R^{23}$ represents a hydrogen atom or a methyl group. In a case where $R^{21}$ and $R^{22}$ represent a hydrogen atom and $R^{23}$ represents a hydrogen atom, the constitutional unit represented by Formula 2 can be a constitutional unit derived from an acrylic acid ester. In a case where $R^{21}$ and $R^{22}$ represent a hydrogen atom and $R^{23}$ represents a methyl atom, the constitutional unit represented by Formula 2 can be a constitutional unit derived from a methacrylic acid ester.

In Formula 2, $L^{12}$ represents a single bond or a divalent linking group. Examples of the divalent linking group include an ester group (—C(═O)O—), a carbonyl group (—C(═O)—), and an arylene group (preferably an arylene group having 6 to 20 carbon atoms).

In Formula 2,*represents a position at which the constitutional unit represented by Formula 2 is bonded to another partial structure constituting the silicon-containing compound, and $R^{11}$, $R^{12}$, $R^{13}$, $L^{11}$, and n have the same meanings as $R^{11}$, $R^{12}$, $R^{13}$, L, and n in Formula 1, and the details thereof are as described above.

In Formula 2, in a case where $R^{21}$ and $R^{22}$ represent a hydrogen atom, $R^{23}$ represents a hydrogen atom or a methyl group, and $L^{12}$ represents an ester group, the constitutional unit represented by Formula 2 can be the constitutional unit represented by Formula 3.

(Formula 3)

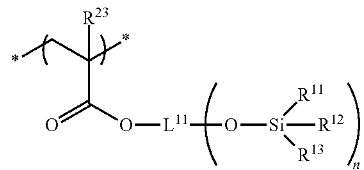

In Formula 3, $R^{23}$ represents a hydrogen atom or a methyl group, * represents a position at which the constitutional unit represented by Formula 3 is bonded to another partial structure constituting the silicon-containing compound, and $R^{11}$, $R^{12}$, $R^{13}$, $L^{11}$, and n have the same meanings as $R^{11}$, $R^{12}$, $R^{13}$, $L^{11}$, and n in Formula 1, and the details thereof are as described above.

The polymer having the constitutional unit represented by Formula 2 may be a homopolymer including a plurality of constitutional units having the same structure, which are represented by Formula 2, or may be a copolymer including a plurality of two or more constitutional units having different structures, which are represented by Formula 2. In such a case, in the polymer having the constitutional unit represented by Formula 2, in a case where the total amount of constitutional units constituting the polymer is set to 100 mol %, the content of the constitutional unit represented by Formula 2 may be 100 mol %.

Alternatively, the polymer having the constitutional unit represented by Formula 2 may be a copolymer of one or two or more constitutional units having different structures, which are represented by Formula 2, and at least one constitutional unit other than the constitutional unit represented by Formula 2. In this case, in the polymer having the constitutional unit represented by Formula 2, in a case where the total amount of constitutional units constituting the polymer is set to 100 mol %, the content of the constitutional unit represented by Formula 2 is preferably 1 mol % or more, and more preferably 10 mol % or more, 20 mol % or more, 30 mol % or more, 40 mol % or more, 50 mol % or more, 60 mol % or more, 70 mol % or more, or 80 mol % or more in this order. In addition, the content may be 99 mol % or less, 95 mol % or less, or 90 mol % or less.

The content can be measured by a well-known method, or can be calculated from a molar ratio of monomers used for polymer synthesis. For example, in a case of a polymer synthesized by using two kinds of monomers (monomer A and monomer B) at a molar ratio of monomer A:monomer B=90:10, in a case where the total amount of the constitutional units constituting the polymer is set to 100 mol %, the content of the constitutional unit derived from the monomer A can be calculated as 90 mol % and the content of the constitutional unit derived from the monomer B can be calculated as 10 mol %.

In a case where the polymer having the constitutional unit represented by Formula 2 is a copolymer, a copolymerization form thereof is not particularly limited, and may be any copolymerization form (for example, random copolymerization, alternating copolymerization, block copolymerization, or graft copolymerization).

In one aspect, the polymer having the constitutional unit represented by Formula 2 can include at least one selected from the group (also referred to as a "group 1 of functional groups") consisting of a carboxy group (—COOH), an amino group ($—NH_2$), a hydroxy group (—OH), a sulfo group ($—S(=O)_2(OH)$), a phosphonoxy group ($—OP(=O)(OH)_2$), and salts thereof, an alkyl group, a glycol structure, an ester structure, an amide structure, an anionic structure, and an amphoteric structure.

The salt can be, for example, an alkali metal salt. The same applies to a salt related to the following group of functional groups.

With regard to the alkyl group, the above description regarding the alkyl group represented by $R^{11}$, $R^{12}$, and/or $R^{13}$ can be referred to. The same applies to an alkyl group related to the following group of functional groups.

Examples of the glycol structure and a glycol structure related to the following group of functional groups include a polyalkyleneoxy group or a combination of two or more polyalkyleneoxy groups. Specific examples of the polyalkyleneoxy group include a polyethyleneoxy group, a polypropyleneoxy group, and a polybutyleneoxy group.

Examples of the ester structure and an ester structure related to the following group of functional groups include a carboxylic acid ester, a sulfonic acid ester, a phosphoric acid ester, and a boronic acid ester.

Examples of the amide structure and an amide related to the following group of functional groups include a structure derived from acrylamides such as (meth)acrylamide, N-methyl (meth)acrylamide, N-ethyl (meth)acrylamide, N-n (normal)-propyl (meth)acrylamide, N-isopropyl (meth)acrylamide, N-n-butyl (meth)acrylamide, N-methylol (meth) acrylamide, N-(2-hydroxyethyl)acrylamide, N-methoxymethyl (meth)acrylamide, N-butoxymethyl (meth)acrylamide, N-(2-dimethylaminoethyl)(meth)acrylamide, N-(3-dimethylaminopropyl)(meth)acrylamide, diacetone(meth)acrylamide, N,N-dimethyl (meth)acrylamide, and N-(meth)acryloylmorpholine. In the present invention and the present specification, the term "(meth)acryl" is used to include acryl and methacryl.

The anionic structure preferably has a monovalent substituent represented by "$(—C(=O)—O^-)_nM^{1}$" or "$(—S(=O)_2—O^-)_nM^{1}$". $M^1$ represents a cation, and n represents a valence of the cation $M^1$. $M^1$ can represent an alkali metal cation, an alkaline earth metal cation, an Mg cation, an Al cation, or a quaternary ammonium cation represented by $R^1R^2R^3R^4N^+$. $R^1$ to $R^4$ each independently represent a hydrogen atom or a linear or branched alkyl group having 1 to 20 carbon atoms. Examples of the alkali metal include lithium (Li), sodium (Na), potassium (K), and cesium (Cs). In addition, examples of the alkaline earth metal include calcium (Ca), strontium (Sr), and barium (Ba).

The quaternary ammonium cation ($R^1R^2R^3R^4N^+$) is not particularly limited as long as $R^1$ to $R^4$ each independently represent a hydrogen atom or a linear or branched alkyl group having 1 to 20 carbon atoms. More specific examples of the quaternary ammonium cation include $(CH_3)_4N^+$, $(C_2H_5)_4N^+$, $(C_3H_7)_4N^+$, $(C_4H_9)_4N^+$, $(C_5H_{11})_4N^+$, $(C_6H_{13})_4N^+$, $(C_7H_{15})_4N^+$, $(C_8H_{17})_4N^+$, $(C_9H_{19})_4N^+$, and $(C_{10}H_{21})_4N^+$, where $R^1$ to $R^4$ are all the same. In addition, in a case where three of $R^1$ to $R^4$ represent a methyl group and the other one represents a linear or branched alkyl group having 1 to 20 carbon atoms other than a methyl group, examples of the other one include $(C_2H_5)$, $(C_6H_{13})$, $(C_8H_{17})$, $(C_9H_{19})$, $(C_{10}H_{21})$, $(C_{12}H_{25})$, $(C_{14}H_{29})$, $(C_{16}H_{33})$, and $(C_{18}H_{37})$. In a case where two of $R^1$ to $R^4$ represent a methyl group and the other two each independently represent a linear or branched alkyl group having 1 to 20 carbon atoms other than a methyl group, the other two can each represent $(C_8H_{17})$, $(C_{10}H_{21})$, $(C_{12}H_{25})$, $(C_{14}H_{29})$, $(C_{16}H_{33})$, or $(C_{18}H_{37})$, for example. In a case where one of $R^1$ to $R^4$ represents a methyl group and the other three each independently represent a linear or branched alkyl group having 1 to 20 carbon atoms other than a methyl group, the other three can each represent $(C_4H_9)$ or $(C_8H_{17})$, for example.

The amphoteric structure can preferably have "$—N^+R^5R^6R^7·Cl^-$", "$—N^+R^5R^6R^7·Br^-$", "$—N^+R^5R^6R^7·I^-$", "$—N^+R^5R^6R^7CH_3SO^{3-}$", "$—N^+R^5R^6R^7·NO^{3-}$", "$(—N^+R^5R^6R^7)_2CO_3^{2-}$", or "$(—N^+R^5R^6R^7)_2SO_4^{2-}$" at the terminal. $R^5$ to $R^7$ each independently represent a hydrogen atom or a linear or branched alkyl group having 1 to 20 carbon atoms. The amphoteric structure also preferably has a carboxybetaine type "$—N^+R^8R^9(CH_2)_nCO^{2-}$", a sulfobetaine type "—$N^+R^8R^9(CH_2)_nSO^{3-}$", or an amine oxide type "—$N^+R^8R^9O$—" at the terminal. n represents an integer in a range of 1 to 5, $R^8$ and $R^9$ each independently represent a hydrogen atom or a linear or branched alkyl group having 1 to 10 carbon atoms.

In another aspect, the polymer having the constitutional unit represented by Formula 2 can include at least one selected from the group (also referred to as a "group 2 of functional groups") consisting of a carboxy group, an amino group, a hydroxy group, a sulfo group, a phosphonoxy group, and salts thereof, an alkyl group, and a glycol structure.

In addition, in another aspect, the polymer having the constitutional unit represented by Formula 2 can include at least one selected from the group (also referred to as a "group 3 of functional groups") consisting of a carboxy group, an amino group, a hydroxy group, a sulfo group, a phosphonoxy group, and salts thereof, an ester structure, and an amide structure.

The groups and the structures included in each of the groups 1 to 3 of functional groups can be included in a constitutional unit other than the constitutional unit represented by Formula 2. In the polymer having the constitutional unit represented by Formula 2, in a case where the total amount of constitutional units constituting the polymer is set to 100 mol %, the content of such a constitutional unit is 0 mol % in one aspect, and more than 0 mol % in another aspect, and may be 1 mol % or more or 5 mol % or more (for example, 20 mol % or less, 15 mol % or less, or 10 mol % or less). Such a constitutional unit can be represented by, for example, Formula 100. The polymer having the constitutional unit represented by Formula 2 can include one or two or more kinds of such constitutional units.

(Formula 100)

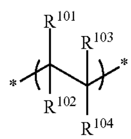

In Formula 100,*represents a position at which the constitutional unit represented by Formula 100 is bonded to another partial structure constituting the silicon-containing compound, and $R^{101}$ is synonymous with $R^{21}$ in Formula 2, $R^{102}$ is synonymous with $R^{22}$ in Formula 2, and $R^{103}$ is synonymous with $R^{23}$ in Formula 2, and the details thereof are as described above.

In Formula 100, $R^{104}$ represents at least one selected from the group consisting of the groups 1 to 3 of functional groups or a substituent including at least one selected from the group consisting of the groups 1 to 3 of functional groups.

In a case where $R^{104}$ represents at least one selected from the group consisting of the groups 1 to 3 of functional groups, $R^{104}$ can be, for example, a carboxy group or a salt thereof.

In a case where $R^{104}$ represents a substituent including at least one selected from the group consisting of the groups 1 to 3 of functional groups, $R^{104}$ can be a monovalent substituent represented by "—C(=O)O-$L^{100}$-Z". Here, Z represents the above-described group or the above-described structure, and $L^{100}$ represents a single bond or a divalent linking group. The divalent linking group represented by $L^{100}$ can be, for example, a linear or branched alkylene group having 1 to 10 carbon atoms, and is preferably a linear alkylene group having 1 to 10 carbon atoms.

From the viewpoint of further reducing the friction coefficient after repeated running, the polymer having the constitutional unit represented by Formula 2 preferably includes at least one selected from the groups 1 to 3 of functional groups, more preferably includes at least one selected from the groups 2 and 3 of functional group, still more preferably includes at least one selected from the group 3 of functional group, still more preferably includes at least one selected from the group consisting of a carboxy group, an amino group, a sulfo group, a phosphonoxy group, and salts thereof, and still more preferably includes at least one selected from the group consisting of a carboxy group, an amino group, and salts thereof.

In addition, the present inventor supposes that the groups and the structures included in the groups 1 to 3 of functional groups can function as an adsorptive functional group, and can contribute to, for example, improvement of dispersibility of the ferromagnetic powder in the magnetic layer.

In the present invention and the present specification, the average molecular weight (weight-average molecular weight and number-average molecular weight) means a value measured by gel permeation chromatography (GPC) with standard polystyrene conversion.

A weight-average molecular weight of the polymer having the constitutional unit represented by Formula 2 may be, for example, 1000 or more, 2000 or more, 3000 or more, 4000 or more, 5000 or more, 6000 or more, 7000 or more, or 8000 or more. In addition, the weight-average molecular weight of the polymer having the constitutional unit represented by Formula 2 may be, for example, less than 200000, 150000 or less, 100000 or less, 50000 or less, or 30000 or less.

The polymer including the constitutional unit represented by Formula 2 can be synthesized by a well-known method. For the synthesis method, for example, a well-known technology related to a synthesis method of a vinyl-based polymer can be referred to. A compound used as a monomer for synthesizing the polymer including the constitutional unit represented by Formula 2 can be obtained as a commercially available product, and can also be synthesized by a well-known method. Specific examples of a monomer which can be used to introduce the partial structure represented by Formula 1 into the polymer include the following monomers K-1 to K-10.

K-1

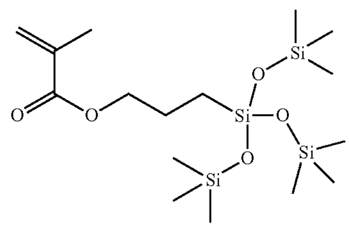

K-2

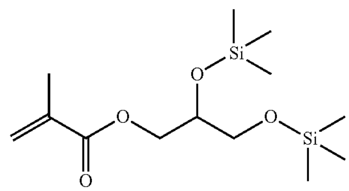

-continued
K-3
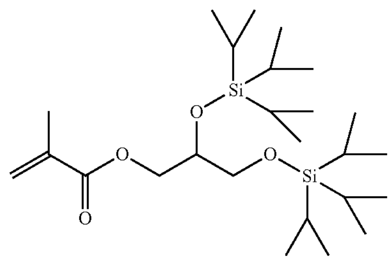
K-4
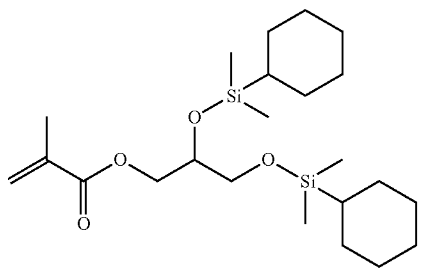
K-5
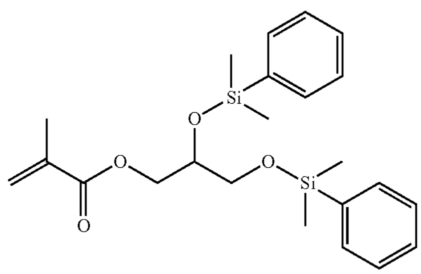
K-6
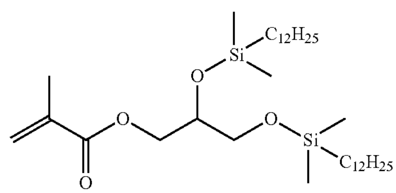
K-7
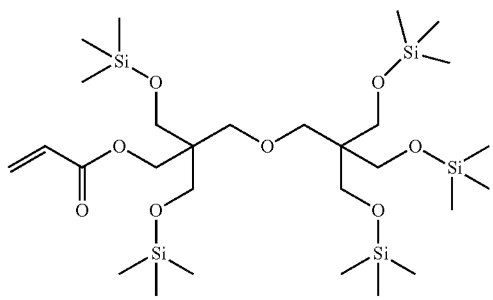
K-8
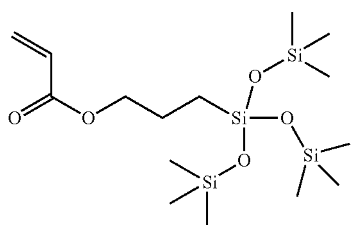
-continued
K-9
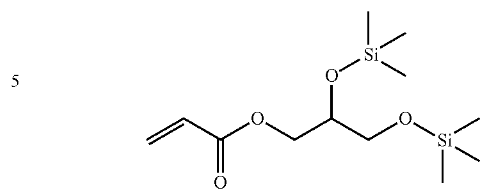
K-10
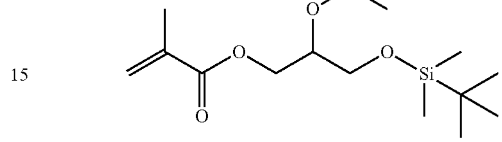
Specific examples of the polymer including the constitutional unit represented by Formula 2 include polymers P-1 to P-21 including the following constitutional units.
P-1
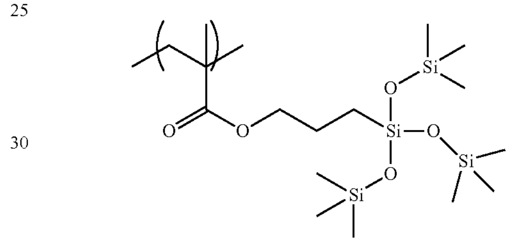
P-2
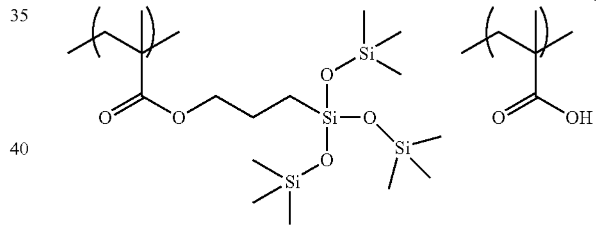
P-3
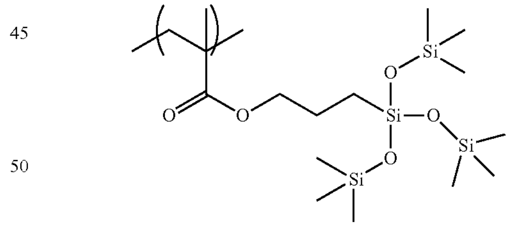
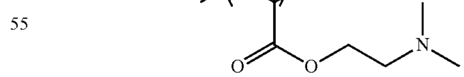
P-4
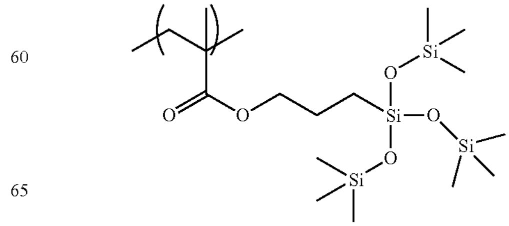

-continued
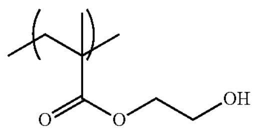
P-5
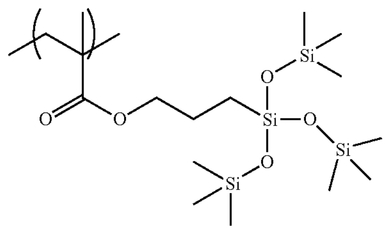
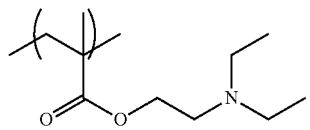
P-6
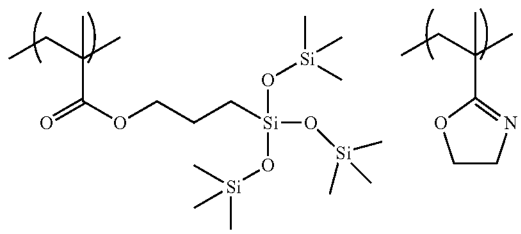
P-7
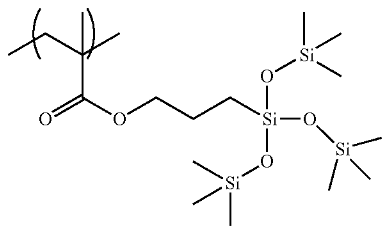
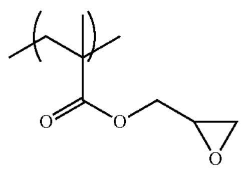
P-8
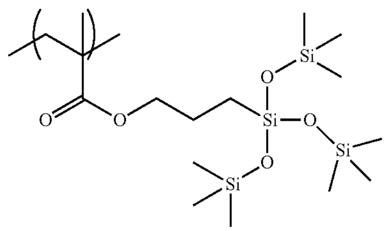
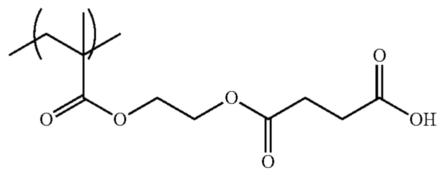
-continued
P-9
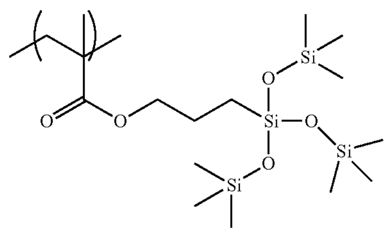
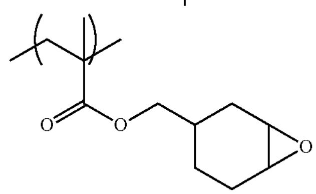
P-10
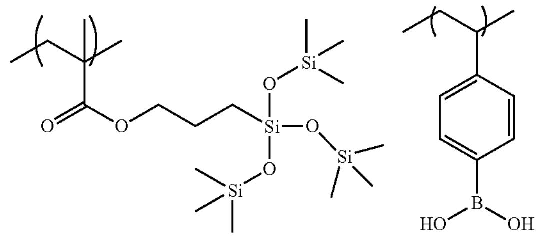
P-11
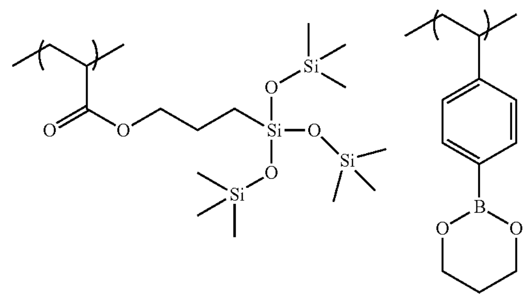
P-12
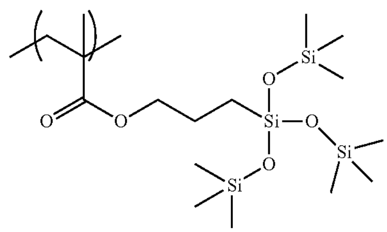
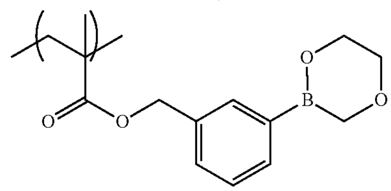
P-13
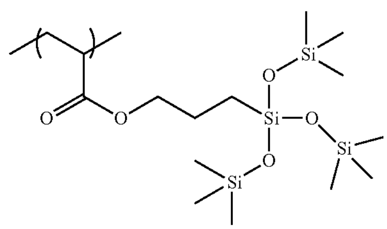

-continued
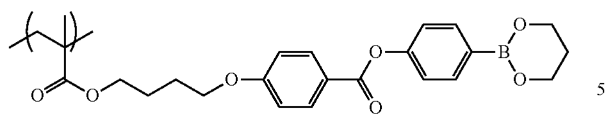
P-14
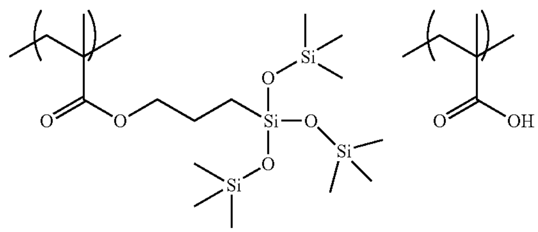
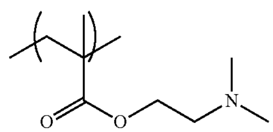
P-15
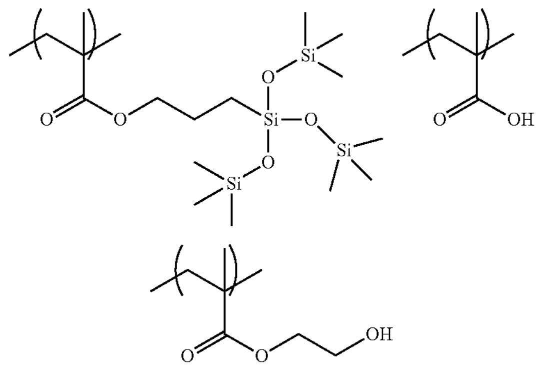
P-16
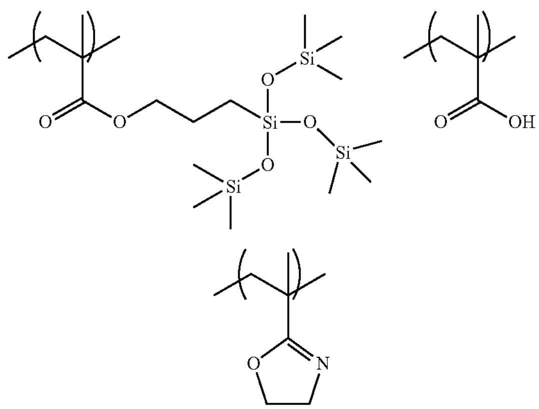
P-17
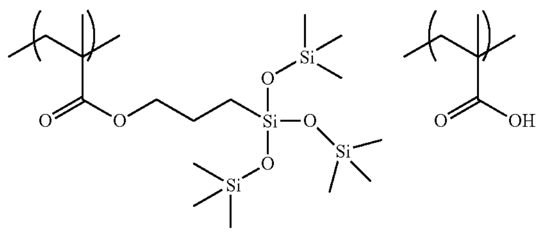
-continued
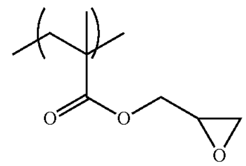
P-18
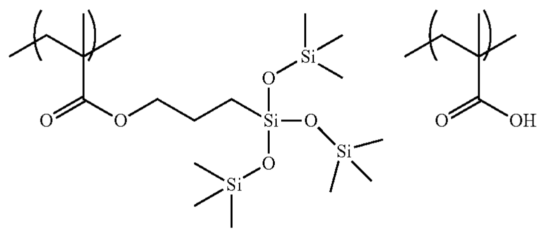
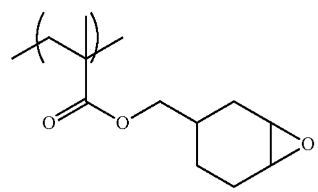
P-19
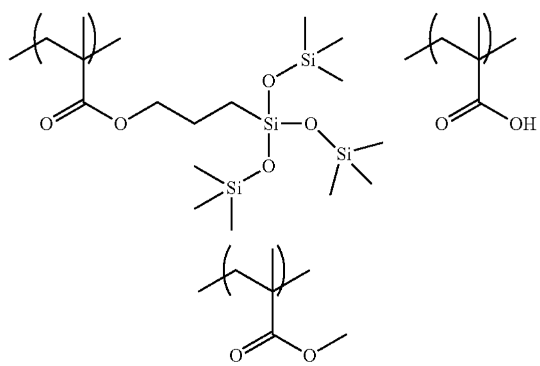
P-20
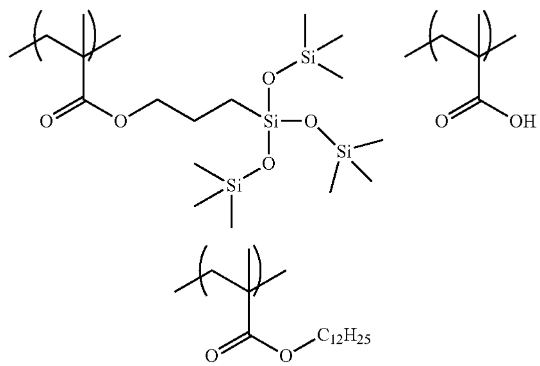
P-21
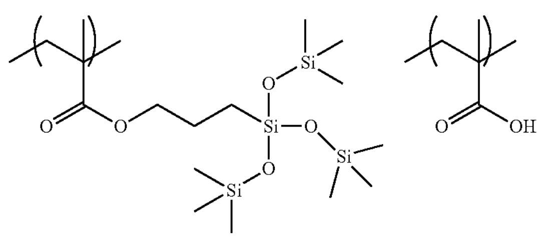

-continued

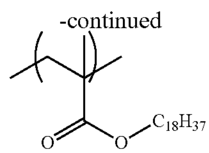

Note that the present invention is not limited to the above-described examples.

(2) Nitrogen-Containing Polymer

In one aspect, the silicon-containing compound may be a nitrogen-containing polymer. The term "nitrogen-containing polymer" refers to a polymer having a plurality of nitrogen-containing constitutional units. The nitrogen-containing constitutional unit contained in the nitrogen-containing polymer may be only one kind or two or more kinds.

A bonding form between the partial structure represented by Formula 1 and the nitrogen atom in the nitrogen-containing polymer is not particularly limited.

In one aspect, in the nitrogen-containing polymer, the partial structure represented by Formula 1 can be bonded to a carbonyl group ($-C(=O)-$) directly or via a divalent linking group at the bonding position represented by *, and the carbonyl group can be bonded to the nitrogen atom of the nitrogen-containing polymer. Such a bond can be a covalent bond.

In another aspect, in the nitrogen-containing polymer, the partial structure represented by Formula 1 can be bonded to a carboxylate ion ($-C(=O)O^-$) directly or via a divalent linking group at the bonding position represented by *, and such a bond can be a covalent bond. The oxygen anion $O^-$ of the carboxylate ion can form a salt crosslinking structure with the nitrogen cation $N^+$ in the nitrogen-containing polymer.

The above-described divalent linking group can be, for example, a divalent linking group represented by "$-(CH_2)_{n2}-C(=O)O-$", and the oxygen atom of the ester group ($-C(=O)O-$) can be bonded to the partial structure represented by Formula 1 and the bonding position represented by *. n2 may be, for example, an integer of 1 or more and 10 or less.

The nitrogen-containing polymer may include a plurality of partial structures represented by Formula 1 bonded to the nitrogen atom of the nitrogen-containing polymer in different bonding forms or in the same bonding form.

The nitrogen-containing polymer can be synthesized by reacting the nitrogen-containing polymer (also referred to as a "nitrogen-containing raw material polymer") with the silicon-containing compound having the partial structure represented by Formula 1 (hereinafter, also referred to as a "silicon-containing raw material compound"). The reaction can easily proceed by mixing the nitrogen-containing raw material polymer and the silicon-containing raw material compound at room temperature. The term "room temperature" described in the present specification is a temperature in a range of 0° C. to 40° C., preferably a temperature in a range of 10° C. to 30° C., and more preferably a temperature in a range of 20° C. to 25° C. In one aspect, it is possible to manufacture a magnetic recording medium including the nitrogen-containing polymer having the partial structure represented by Formula 1 in the magnetic layer by forming the magnetic layer using the nitrogen-containing polymer synthesized by the reaction between the nitrogen-containing raw material polymer and the silicon-containing raw material compound as a component of a composition for forming a magnetic layer. In another aspect, the nitrogen-containing raw material polymer and the silicon-containing raw material compound are used as a component of the composition for forming a magnetic layer, and by mixing these components in a preparation step of the composition for forming a magnetic layer, the nitrogen-containing polymer having the partial structure represented by Formula 1 can be formed by reacting the silicon-containing raw material compound with the nitrogen-containing raw material polymer during the preparation step. The point described above is also applied to a case of forming the non-magnetic layer including the nitrogen-containing polymer having the partial structure represented by Formula 1.

The nitrogen-containing polymer can contain a plurality of polyester chains having the same or different structures. For the polyester chain contained in the nitrogen-containing polymer, the description regarding the polyester chain described below can be referred to.

A weight-average molecular weight of the nitrogen-containing polymer may be, for example, 3000 or more, 4000 or more, or 5000 or more. In addition, the weight-average molecular weight of the nitrogen-containing polymer may be, for example, less than 20000, 15000 or less, or 10000 or less.

In one aspect, the nitrogen-containing polymer can be a polyalkyleneimine-based polymer. In the present invention and the present specification, the "polyalkyleneimine-based polymer" is a polymer containing one or more polyalkyleneimine chains. The polyalkyleneimine chain is a polymerization structure including two or more identical or different alkyleneimine chains. The polyalkyleneimine chain will be described below. In the one aspect, it is considered that the polyalkyleneimine chain can function as an adsorption site to the ferromagnetic powder contained in the magnetic layer.

Hereinafter, the polyalkyleneimine-based polymer that can be used as the nitrogen-containing raw material polymer in a case where the nitrogen-containing polymer is a polyalkyleneimine-based polymer will be described. Unless otherwise noted, the following description regarding the polyalkyleneimine-based polymer also applies to a case where the above-described nitrogen-containing polymer is a polyalkyleneimine-based polymer.

Nitrogen-Containing Raw Material Polymer

Alkyleneimine Chain

In a case where the nitrogen-containing polymer is a polyalkyleneimine-based polymer, in one aspect, examples of the nitrogen-containing raw material polymer that can be used to obtain such a nitrogen-containing polymer include a polyalkyleneimine-based polymer having a polyester chain. In another aspect, a polyalkyleneimine-based polymer having no polyester chain can be used as the nitrogen-containing raw material polymer. In addition, in another aspect, a polyalkyleneimine-based polymer having a polyester chain and the partial structure represented by Formula 1 can also be obtained by using a polyalkyleneimine-based polymer having no polyester chain as the nitrogen-containing raw material polymer, and simultaneously or sequentially reacting this polymer with a polyester and a silicon-containing raw material compound described below.

In a case where the nitrogen-containing raw material polymer is a polyalkyleneimine-based polymer, examples of the alkyleneimine chain contained in the polyalkyleneimine-based polymer include an alkyleneimine chain represented by Formula A and an alkyleneimine chain represented by Formula B. In the alkyleneimine chain represented by the following formula, the alkyleneimine chain represented by Formula A can include a bonding position with a polyester chain described below. In addition, the alkyleneimine chain represented by the formula B can be bonded to a polyester chain by forming a salt crosslinking structure. In addition, the polyalkyleneimine chain may consist only of a linear structure or may have a branched tertiary amine structure. Examples of the chain having a branched structure include a chain that is bonded to an adjacent alkyleneimine chain in *1 in Formula A and a chain that is bonded to an adjacent alkyleneimine chain in *2 in Formula B.

(Formula A)

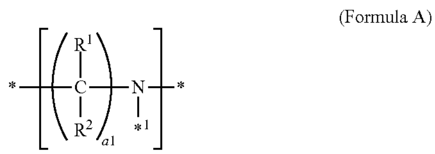

In Formula A, $R^1$ and $R^2$ each independently represent a hydrogen atom or an alkyl group, a1 represents an integer of 2 or more, and $*^1$ represents a bonding position with another adjacent polymer chain (for example, an adjacent alkyleneimine chain or a polyester chain described below) or a hydrogen atom or a substituent.

(Formula B)

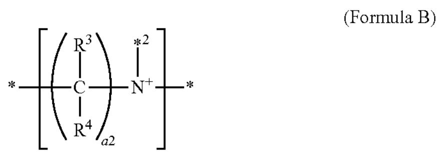

In Formula B, $R^3$ and $R^4$ each independently represent a hydrogen atom or an alkyl group, and a2 represents an integer of 2 or more. In the alkyleneimine chain represented by Formula B, an anionic group of another polymer chain and $N^+$ in Formula B can form a salt crosslinking structure.

* in Formula A and Formula B and $*^2$ in Formula B each independently represent a position to be bonded to an adjacent alkyleneimine chain, a hydrogen atom, or a substituent.

Hereinafter, Formula A and Formula B will be described in more detail.

$R^1$ and $R^2$ in Formula A, and $R^3$ and $R^4$ in Formula B each independently represent a hydrogen atom or an alkyl group. Examples of the alkyl group include an alkyl group having 1 to 6 carbon atoms, preferably an alkyl group having 1 to 3 carbon atoms, more preferably a methyl group or an ethyl group, and still more preferably a methyl group. The combination of $R^1$ and $R^2$ in Formula A may be a form in which one is a hydrogen atom and the other is an alkyl group, a form in which both are hydrogen atoms, and a form in which both are alkyl groups (the same or different alkyl groups), and the form in which both are hydrogen atoms is preferable. The above point is also applied to $R^3$ and $R^4$ in Formula B.

As the alkyleneimine, a structure having the lowest number of carbon atoms constituting a ring is ethyleneimine, and the number of carbon atoms in a main chain of the alkyleneimine chain (ethyleneimine chain) obtained by the ring opening of the ethyleneimine is 2. Therefore, a lower limit of a1 in Formula A and a lower limit of a2 in Formula B are 2. That is, a1 in Formula A and a2 in Formula B each independently represent an integer of 2 or more. a1 in Formula A and a2 in Formula B may each be independently, for example, 10 or less, preferably 6 or less, more preferably 4 or less, still more preferably 2 or 3, and even still more preferably 2.

The details of the bonding of the alkyleneimine chain represented by Formula A and the alkyleneimine chain represented by Formula B to the polyester chain and the formation of the salt crosslinking structure will be described below.

Each of the above alkyleneimine chains is bonded to an adjacent alkyleneimine chain, a hydrogen atom, or substituent at a position represented by * in each formula. Examples of the substituent include a monovalent substituent such as an alkyl group (for example, an alkyl group having 1 to 6 carbon atoms), but the substituent is not limited thereto. In addition, as the substituent, another polymer chain (for example, a polyester chain described below) may be bonded.

A number-average molecular weight of the polyalkyleneimine chain contained in the polyalkyleneimine-based polymer is preferably 300 or more, and more preferably 500 or more. In addition, the number-average molecular weight of the polyalkyleneimine chain is preferably 3000 or less, and more preferably 2000 or less. A number-average molecular weight of the polyalkyleneimine used for synthesizing the polyalkyleneimine-based polymer can be employed as the number average molecular weight of the polyalkyleneimine chain contained in the polyalkyleneimine-based polymer.

Polyester Chain

The polyalkyleneimine-based polymer that can be used as the nitrogen-containing raw material polymer can contain a polyester chain together with the polyalkyleneimine chain described above. In addition, in a case where the silicon-containing compound is a polyalkyleneimine-based polymer, such a polyalkyleneimine-based polymer can include a polyalkyleneimine chain and a polyester chain. In the present invention and the present specification, the term "polyester chain" refers to a polymer chain having a plurality of ester groups. In one aspect, the polyester chain is bonded to the alkyleneimine chain represented by Formula A via a nitrogen atom N and a carbonyl group —(C═O)— included in Formula A in $*^1$ of Formula A, to form —N—(C═O)—. In addition, in another aspect, the alkyleneimine chain represented by Formula B and the polyester chain can form a salt crosslinking structure by the nitrogen cation $N^+$ in Formula B and the anionic group included in the polyester chain. Examples of the salt crosslinking structure include a structure formed of an oxygen anion $O^-$ contained in the polyester chain and $N^+$ in Formula B, but the salt crosslinking structure is not limited thereto.

Examples of the polyester chain bonded to the alkyleneimine chain represented by Formula A via the nitrogen atom N and the carbonyl group —(C═O)— included in Formula A include a polyester chain represented by Formula 11. The polyester chain represented by Formula 11 can be bonded to the alkyleneimine chain represented by Formula A by forming —N—(C═O)— by the nitrogen atom contained in the alkyleneimine chain and the carbonyl group —(C═O)— contained in the polyester chain at the bonding position represented by * 1.

Formula 11

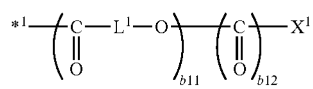

In addition, as the polyester chain bonded to the alkyleneimine chain represented by Formula B by forming the salt crosslinking structure by $N^+$ in Formula B and the anionic group contained in the polyester chain, a polyester chain represented by Formula 12 can be used. The polyester chain represented by Formula 12 can form a salt crosslinking structure with the nitrogen cation $N^+$ in Formula B by an oxygen anion $O^-$.

Formula 12

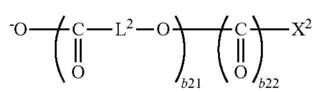

$L^1$ in Formula 11 and $L^2$ in Formula 2 each independently represent a divalent linking group. Preferred examples of the divalent linking group include an alkylene group having 3 to 30 carbon atoms. In a case where the alkylene group has a substituent, the number of carbon atoms in the alkylene group refers to the number of carbon atoms in a portion (that is, main chain portion) excluding the substituent as described above.

b11 in Formula 11 and b21 in Formula 2 each independently represent an integer of 2 or more, and are, for example, an integer of 200 or less.

b12 in Formula 11 and b22 in Formula 2 each independently represent 0 or 1.

$X^1$ in Formula 11 and $X^2$ in Formula 2 each independently represent a hydrogen atom or a monovalent substituent. Examples of the monovalent substituent include a monovalent substituent selected from the group consisting of an alkyl group, an alkoxy group, a polyalkyleneoxyalkyl group, and an aryl group.

The alkyl group may have a substituent or may be unsubstituted. As the alkyl group having a substituent, an alkyl group substituted with a hydroxy group (hydroxyalkyl group) is preferable. The alkyl group is more preferably an alkyl group having 1 to 30 carbon atoms and still more preferably an alkyl group having 1 to 10 carbon atoms. The alkyl group may be any of linear, branched, or cyclic.

For specific examples of the substituted or unsubstituted alkyl group, a description disclosed in a paragraph 0052 of JP2015-28830A can be referred to. For specific examples of the alkoxy group, a description disclosed in a paragraph 0053 of JP2015-28830A can be referred to.

The polyalkyleneoxyalkyl group is a monovalent substituent represented by $R^{70}(OR^{71})_{n1}(O)_{m1}$—. $R^{70}$ represents an alkyl group, $R^{71}$ represents an alkylene group, n1 represents an integer of 2 or more, and m1 represents 0 or 1.

The alkyl group represented by $R^{70}$ is as described with respect to the alkyl groups represented by $X^1$ and $X^2$. Regarding the details of the alkylene group represented by $R^{71}$, the above description regarding the alkyl groups represented by $X^1$ and $X^2$ can be applied by replacing the alkyl group with an alkylene group in which one hydrogen atom is removed from the alkylene group (for example, a methyl group is replaced with the methylene group). n1 is an integer of 2 or more, and is, for example, an integer of 10 or less and preferably an integer of 5 or less.

The aryl group may have a substituent or may be fused, and is more preferably an aryl group having 6 to 24 carbon atoms, and examples thereof include a phenyl group, a 4-methylphenyl group, 4-phenylbenzoic acid, a 3-cyanophenyl group, a 2-chlorophenyl group, and a 2-naphthyl group.

Each of the polyester chain represented by Formula 11 and the polyester chain represented by Formula 12 can have a structure derived from polyester obtained by a well-known polyester synthesis method. Examples of the polyester synthesis method include ring-opening polymerization of a lactone. Examples of the lactone include various lactones disclosed in a paragraph 0056 of JP2015-28830A. As the lactone, from the viewpoint of reactivity and/or availability, ε-caprolactone, lactide, or δ-valerolactone is preferable. Note that the present invention is not limited thereto, and any lactone may be used as long as polyester can be obtained by ring-opening polymerization.

For a nucleophilic reagent for ring-opening polymerization of a lactone, a description disclosed in a paragraph 0057 of JP2015-28830A can be referred to.

Note that the polyester chain is not limited to the structure derived from polyester obtained by ring-opening polymerization of a lactone, and it can also have a structure derived from polyester obtained by a well-known polyester synthesis method such as polycondensation of a polyvalent carboxylic acid and a polyhydric alcohol, or polycondensation of hydroxycarboxylic acid.

In one aspect, a number-average molecular weight of the polyester chain is preferably 200 or more, more preferably 400 or more, and still more preferably 500 or more. In addition, in one aspect, the number-average molecular weight of the polyester chain is preferably 100000 or less and more preferably 50000 or less.

Weight-Average Molecular Weight of Nitrogen-Containing Raw Material Polymer

An average molecular weight of the polyalkyleneimine-based polymer that can be used as the nitrogen-containing raw material polymer may be, for example, 1000 or more and may be, for example, 80000 or less as the weight-average molecular weight. In addition, a weight-average molecular weight of the polyalkyleneimine-based polymer that can be used as the nitrogen-containing raw material polymer is preferably 1500 or more, more preferably 2000 or more, and still more preferably 3000 or more. In addition, in one aspect, the weight-average molecular weight of the polyalkyleneimine-based polymer that can be used as the nitrogen-containing raw material polymer is preferably 60000 or less, more preferably 40000 or less, still more preferably 35000 or less, still preferably 34000 or less, still more preferably 30000 or less, still more preferably 20000 or less, and even still more preferably 10000 or less.

Synthesis Method

A synthesis method of the polyalkyleneimine-based polymer used as the nitrogen-containing raw material polymer is not particularly limited. For one aspect of the synthesis method, paragraphs 0061 to 0069 and Examples of JP2015-28830A can be referred to.

Silicon-Containing Raw Material Compound

The silicon-containing raw material compound can be obtained as a commercially available product, and can also be synthesized by a well-known method. Examples of the silicon-containing raw material compound include a carboxy group-containing compound having the partial structure represented by Formula 1. According to such a compound, the carboxy group of the compound is bonded to the nitrogen atom of the nitrogen-containing raw material polymer and/or a salt crosslinking structure is formed, so that the partial structure represented by Formula 1 can be introduced into the nitrogen-containing polymer in the above-described bonding form. Specific examples of the carboxy group-containing compound having the partial structure represented by Formula 1 include the following compounds S-1 and S-2. Note that the present invention is not limited to such an example.

S-1

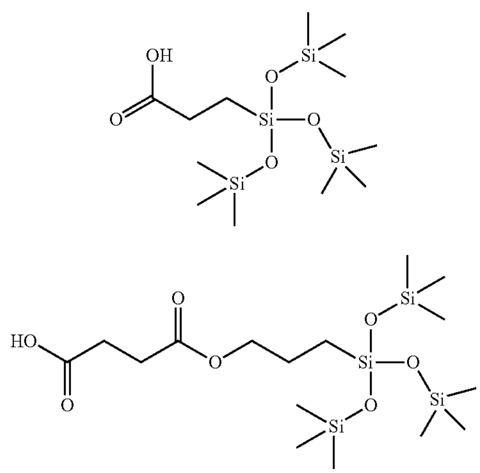

S-2

For example, the magnetic layer or the composition for forming a magnetic layer can contain the above-described silicon-containing compound in an amount of 0.1 parts by mass or more and preferably in an amount of 0.5 parts by mass or more with respect to 100 parts by mass of the ferromagnetic powder. In addition, the content of the silicon-containing compound in the magnetic layer or the composition for forming a magnetic layer may be, for example, 50.0 parts by mass or less, 40.0 parts by mass or less, 30.0 parts by mass or less, 20.0 parts by mass or less, 15.0 parts by mass or less, or 10.0 parts by mass or less per 100 parts by mass of the ferromagnetic powder. The silicon-containing compound contained in the magnetic layer or the composition for forming a magnetic layer may be used alone or in combination of two or more kinds thereof. The content in a case where two or more kinds thereof are contained is the total content of the two or more kinds thereof.

In addition, in a case where the nitrogen-containing raw material polymer and the silicon-containing raw material compound are used as a component of the composition for forming a magnetic layer, the contents of the nitrogen-containing raw material polymer and the silicon-containing raw material compound in the composition for forming a magnetic layer are as follows.

A content of the nitrogen-containing raw material polymer in the composition for forming a magnetic layer is preferably 0.1 parts by mass or more and more preferably 0.5 parts by mass or more per 100 parts by mass of the ferromagnetic powder. The content of the nitrogen-containing raw material polymer in the composition for forming a magnetic layer may be, for example, 20.0 parts by mass or less, 15.0 parts by mass or less, or 10.0 parts by mass or less per 100 parts by mass of the ferromagnetic powder.

A content of the silicon-containing raw material compound in the composition for forming a magnetic layer is preferably 1.0 part by mass or more, more preferably 3.0 parts by mass or more, and still more preferably 5.0 parts by mass or more per 100 parts by mass of the ferromagnetic powder. The content of the silicon-containing raw material compound in the composition for forming a magnetic layer may be, for example, 20.0 parts by mass or less, 15.0 parts by mass or less, or 10.0 parts by mass or less per 100 parts by mass of the ferromagnetic powder.

Regarding the non-magnetic layer and a composition for forming a non-magnetic layer, the above description can be applied by replacing the ferromagnetic powder with the non-magnetic powder.

Regarding a mixing ratio of the nitrogen-containing raw material polymer and the silicon-containing raw material compound, with the total amount of the nitrogen-containing raw material polymer and the silicon-containing raw material compound (on a mass basis) being 100% by mass, the ratio of the silicon-containing raw material compound may be 10% by mass or more, 15% by mass or more, 20% by mass or more, 25% by mass or more, or 30% by mass or more, and may be 90% by mass or less, 80% by mass or less, 70% by mass or less, 60% by mass or less, or 50% by mass or less.

The magnetic recording medium may or may not include, together with the silicon-containing compound, a nitrogen-containing polymer having no partial structure represented by Formula 1 (hereinafter, also referred to as "other nitrogen-containing polymer") in the portion on the non-magnetic support on the magnetic layer side. In one aspect, as the other nitrogen-containing polymer, the polyalkyleneimine-based polymer described above as an example of the nitrogen-containing raw material polymer can be used. The polyalkyleneimine-based polymer described above can function as a dispersing agent for improving dispersibility of the ferromagnetic powder. A nitrogen-containing polymer, which is one aspect of the silicon-containing compound, can also function as a dispersing agent for improving dispersibility of the ferromagnetic powder.

In a case of including the other nitrogen-containing polymer, a content of the other nitrogen-containing polymer in the magnetic layer or the composition for forming a magnetic layer may be, for example, 0.1 parts by mass or more and 20.0 parts by mass or less, or 1.0 part by mass or more and 15.0 parts by mass or less per 100 parts by mass of the ferromagnetic powder. Regarding the non-magnetic layer and the composition for forming a non-magnetic layer, the above description can be applied by replacing the ferromagnetic powder with the non-magnetic powder.

Hereinafter, the magnetic layer of the magnetic recording medium and the like will be further described in detail.

Magnetic Layer

Ferromagnetic Powder

A magnetic layer contains a ferromagnetic powder. As a ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in an X-ray diffraction spectrum obtained by X-ray diffraction analysis, it is determined that the hexagonal ferrite crystal structure is detected as the main phase. In a case where only a single structure is detected by X-ray diffraction analysis, this detected structure is taken as the main phase. The hexagonal ferrite crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is one aspect of the hexagonal ferrite powder, will be described in more detail.

An activation volume of the hexagonal strontium ferrite powder is preferably in a range of 800 to 1500 $nm^3$. The finely granulated hexagonal strontium ferrite powder having an activation volume in the above range is suitable for manufacturing a magnetic recording medium exhibiting excellent electromagnetic conversion characteristics. The activation volume of the hexagonal strontium ferrite powder is preferably 800 $nm^3$ or more, and may be, for example, 850 $nm^3$ or more. From the viewpoint of further improving the electromagnetic conversion characteristics, the activation volume of the hexagonal strontium ferrite powder is more preferably 1400 $nm^3$ or less, still more preferably 1300 $nm^3$ or less, still more preferably 1200 $nm^3$ or less, and still more preferably 1100 $nm^3$ or less.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity He and an activation volume V, by performing measurement in a coercivity He measurement portion at a magnetic field sweep rate of 3 minutes and 30 minutes using a vibrating sample magnetometer (measurement temperature: 23° C. 1° C.). For a unit of the anisotropy constant Ku, 1 erg/cc=$1.0\times10^{-1}$ $J/m^3$.

$$He=2Ku/Ms\{1-[(kT/KuV)\ln(At/0.693)]^{1/2}\}$$

[In the above expression, Ku: anisotropy constant (unit: $J/m^3$), Ms: saturation magnetization (Unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of $1.8\times10^5$ $J/m^3$ or more, and more preferably has Ku of $2.0\times10^5$ $J/m^3$ or more. Ku of the hexagonal strontium ferrite powder may be, for example, $2.5\times10^5$ $J/m^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content >1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

It is speculated that the use of the hexagonal strontium ferrite powder having the rare earth atom surface layer portion uneven distribution property as the ferromagnetic powder of the magnetic layer contributes to the prevention of scraping of the magnetic layer surface due to the sliding on the magnetic head. That is, it is speculated that the hexagonal strontium ferrite powder having the rare earth atom surface layer portion uneven distribution property can also contribute to the improvement of running durability of the magnetic recording medium. It is speculated that this may be because uneven distribution of rare earth atoms on a surface of a particle constituting the hexagonal strontium ferrite powder contributes to an improvement of interaction between the particle surface and an organic substance (for example, a binding agent and/or an additive) contained in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 $A \cdot m^2/kg$ or more, and may be 47 $A \cdot m^2/kg$ or more. On the other hand, from the viewpoint of noise reduction, σs is preferably 80 $A \cdot m^2/kg$ or less and more preferably 60 $A \cdot m^2/kg$ or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 1194 kA/m (15 kOe).

Regarding the content (bulk content) of a constituent atom of the hexagonal strontium ferrite powder, a strontium atom content may be, for example, in a range of 2.0 to 15.0 at % with respect to 100 at % of an iron atom. In one aspect, the hexagonal strontium ferrite powder may include only a strontium atom as a divalent metal atom. In another aspect, the hexagonal strontium ferrite powder may include one or more other divalent metal atoms in addition to a strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M type hexagonal ferrite is represented by a composition formula of $AFe_{12}O_{19}$. Here, A represents a divalent metal atom, and in a case where the hexagonal strontium ferrite powder is the M type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an ε-iron oxide crystal structure is detected as a main phase by X-ray diffraction analysis. For example, in a case where the highest intensity diffraction peak is attributed to an ε-iron oxide crystal structure in an X-ray diffraction spectrum obtained by X-ray diffraction analysis, it is determined that the ε-iron oxide crystal structure is detected as the main phase. As a method of manufacturing an ε-iron oxide powder, a manufacturing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the method of manufacturing the ε-iron oxide powder capable of being used as the ferromagnetic powder in the magnetic layer of the magnetic recording medium is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic recording medium exhibiting excellent electromagnetic conversion characteristics. The activation volume of the ε-iron oxide powder is preferably 300 $nm^3$ or more, and may be, for example, 500 $nm^3$ or more. Further, from the viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, for improving the thermal stability may include the anisotropy constant Ku. The ε-iron oxide powder preferably has Ku of $3.0\times10^4$ $J/m^3$ or more, and more preferably has Ku of $8.0\times10^4$ $J/m^3$ or more. Ku of the F-iron oxide powder may be, for example, $3.0\times10^5$ $J/m^3$ or less. Here, since higher Ku means higher thermal stability, which is preferable, a value thereof is not limited to the values exemplified above.

From the viewpoint of increasing the reproduction output in a case of reproducing data recorded on the magnetic recording medium, it is desirable that mass magnetization as of the ferromagnetic powder included in the magnetic recording medium is high. In this regard, in one aspect, as of the ε-iron oxide powder may be 8 $A\cdot m^2/kg$ or more, and may be 12 $A\cdot m^2/kg$ or more. On the other hand, from the viewpoint of noise reduction, as of the ε-iron oxide powder is preferably 40 $A\cdot m^2/kg$ or less and more preferably 35 $A\cdot m^2/kg$ or less.

In the present invention and the present specification, unless otherwise noted, an average particle size of various powders such as ferromagnetic powders is a value measured by the following method using a transmission electron microscope.

The powder is imaged at an imaging magnification of 100000× with a transmission electron microscope, the image is printed on photographic printing paper or displayed on a display so that the total magnification of 500000× to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic recording medium in order to measure the particle size, a method disclosed in a paragraph 0015 of JP2011-048878A can be employed, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer. The magnetic layer includes the ferromagnetic powder, can include the binding agent, and can also include any one or more kinds of additives. A high filling percentage of the ferromagnetic powder in the magnetic layer is preferable from the viewpoint of improving the recording density.

Binding Agent and Curing Agent

The magnetic recording medium can be a coating type magnetic recording medium, and can include a binding agent in the magnetic layer. The binding agent is one or more kinds of resin. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below. For the above binding agent, descriptions disclosed in paragraphs 0028 to 0031 of JP2010-24113A can also be referred to. The content of the binding agent of the magnetic layer can be, for example, 1.0 to 30.0 parts by mass with respect to 100.0 parts by mass of the ferromagnetic powder. An average molecular weight of the resin used as the binding agent can be, for example, 10000 or more and 200000 or less as a weight-average molecular weight. Unless otherwise noted, the weight-average molecular weight described in the section of Examples described below is a value measured by gel permeation chromatography (GPC) under the following measurement conditions with standard polystyrene conversion. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: tetrahydrofuran (THF)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The content of the curing agent in the composition for forming a magnetic layer may be, for example, 0 to 80.0 parts by mass, and from the viewpoint of improving a strength of the magnetic layer, may be 50.0 to 80.0 parts by mass, with respect to 100.0 parts by mass of the binding agent.

Additive

The magnetic layer may include one or more kinds of additives, as necessary. As the additives, the curing agent described above is used as an example. In addition, examples of the additive which can be included in the magnetic layer include a non-magnetic powder, a lubricant, a dispersing agent, a dispersing assistant, a fungicide, an antistatic agent, and an antioxidant. For the dispersing agent, descriptions disclosed in paragraphs 0061 and 0071 of JP2012-133837A can be referred to. The dispersing agent may be added to a composition for forming a non-magnetic layer. For the dispersing agent that can be added to the composition for forming a non-magnetic layer, a description disclosed in a paragraph 0061 of JP2012-133837A can be referred to. In addition, examples of the non-magnetic powder that can be included in the magnetic layer include a non-magnetic powder which can function as an abrasive and a non-magnetic powder which can function as a protrusion forming agent which forms protrusions suitably protruded from the magnetic layer surface. Examples of the abrasive include powders of alumina ($Al_2O_3$), silicon carbide, boron carbide ($B_4C$), TiC chromium oxide ($Cr_2O_3$), cerium oxide, zirconium oxide ($ZrO_2$), iron oxide, and diamond that are materials normally used as the abrasive of the magnetic layer. The powders of alumina such as $\alpha$-alumina, silicon carbide, and diamond are preferable among the above. A content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder. An average particle size of the abrasive is, for example, in a range of 30 to 300 nm, and preferably in a range of 50 to 200 nm. As the protrusion forming agent, carbon black, colloidal particles, and the like can be used. A content of the protrusion forming agent in the magnetic layer is preferably 0.1 to 10.0 parts by mass, more preferably 0.1 to 5.0 parts by mass, and still more preferably 0.5 to 5.0 parts by mass with respect to 100.0 parts by mass of the ferromagnetic powder. An average particle size of the colloidal particles is, for example, preferably in a range of 90 to 200 nm, and more preferably in a range of 100 to 150 nm. An average particle size of the carbon black is preferably in a range of 5 to 200 nm and more preferably in a range of 10 to 150 nm.

The magnetic recording medium can include one or more fatty acid compounds selected from the group consisting of a fatty acid, a fatty acid ester, and a fatty acid amide in a portion on the non-magnetic support on the magnetic layer side. The above-described fatty acid compound can function as a lubricant. The portion on the magnetic layer side may contain only one fatty acid compound selected from the group consisting of a fatty acid, a fatty acid ester, and a fatty acid amide, or may contain two or more components. In addition, only one or two or more fatty acids may be contained as the fatty acid. The same applies to the fatty acid ester and the fatty acid amide.

Examples of the fatty acid include lauric acid, myristic acid, palmitic acid, stearic acid, oleic acid, linoleic acid, linolenic acid, behenic acid, erucic acid, elaidic acid, stearic acid, myristic acid, and palmitic acid are preferable, and stearic acid is more preferable. The fatty acid may be included in the magnetic layer in a form of a salt such as a metal salt.

Examples of the fatty acid ester include esters of the above-described exemplified various fatty acids. Specific examples thereof include butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of the fatty acid amide include amides of the above-described exemplified various fatty acids. Specific examples thereof include amides of the various fatty acids, for example, lauric acid amide, myristic acid amide, palmitic acid amide, and stearic acid amide.

For the fatty acid and a derivative of the fatty acid (such as amide and ester), a fatty acid-derived moiety of the fatty acid derivative preferably has a structure which is the same as or similar to that of the fatty acid used in combination. For example, in a case where stearic acid is used as the fatty acid, it is preferable to use stearic acid amide and/or stearic acid ester in combination.

In one aspect, the magnetic recording medium including one or more fatty acid compounds selected from the group consisting of a fatty acid, a fatty acid ester, and a fatty acid amide in the portion on the magnetic layer side can be manufactured by forming the magnetic layer using the composition for forming a magnetic layer containing one or more of the above fatty acid compounds. In addition, in one aspect, the magnetic recording medium including one or more of the fatty acid compounds in the portion on the magnetic layer side can be manufactured by forming the non-magnetic layer using the composition for forming a non-magnetic layer containing one or more of the above fatty acid compounds. In addition, in one aspect, the magnetic recording medium including one or more of the fatty acid compounds in the portion on the magnetic layer side can be manufactured by forming the non-magnetic layer using the composition for forming a non-magnetic layer containing one or more of the above fatty acid compounds and the magnetic layer using the composition for forming a magnetic layer containing one or more of the above fatty acid compounds. The non-magnetic layer can play a role of holding a component that can function as a lubricant such as a fatty acid, a fatty acid ester, a fatty acid amide, and a fatty acid amide, and supplying the component to the magnetic layer. The lubricant such as a fatty acid, a fatty acid ester, and a fatty acid amide included in the non-magnetic layer may be transferred to the magnetic layer and present in the magnetic layer.

A content of the fatty acid in the magnetic layer or the composition for forming a magnetic layer is preferably 0.5 to 3.0 parts by mass with respect to 100.0 parts by mass of the ferromagnetic powder.

A content of the fatty acid ester in the magnetic layer or the composition for forming a magnetic layer is, for example, 0 to 10.0 parts by mass, and preferably 0.5 to 7.0 parts by mass per 100.0 parts by mass of the ferromagnetic powder.

A content of the fatty acid amide in the magnetic layer or the composition for forming a magnetic layer is, for example, 0 to 1.0 part by mass, and preferably 0.1 to 1.0 part by mass per 100.0 parts by mass of the ferromagnetic powder.

Regarding contents of the fatty acid, the fatty acid ester, and the fatty acid amide in the non-magnetic layer or the composition for forming a non-magnetic layer, the above description can be applied by replacing the ferromagnetic powder with the non-magnetic powder.

Regarding a mixing ratio of the silicon-containing compound and the fatty acid compound in the magnetic layer or the composition for forming a magnetic layer, with the total amount of the silicon-containing compound and the fatty acid compound (on a mass basis) being 100% by mass, the ratio of the fatty acid compound can be 10% by mass or more, 15% by mass or more, 20% by mass or more, 25% by mass or more, or 30% by mass or more, and can be 90% by mass or less, 80% by mass or less, 70% by mass or less, 60% by mass or less, or 50% by mass or less. The above-described point also applies to a mixing ratio of the silicon-containing compound and the fatty acid compound in the non-magnetic layer or the composition for forming a non-magnetic layer.

The magnetic layer described above can be provided on a surface of the non-magnetic support directly or indirectly through the non-magnetic layer.

Non-Magnetic Layer

Next, the non-magnetic layer will be described. The above magnetic recording medium may have a magnetic layer directly on the surface of the non-magnetic support, or may have a magnetic layer on the surface of the non-magnetic support via a non-magnetic layer including non-magnetic powder. The non-magnetic powder used in the non-magnetic layer may be an inorganic powder or an organic powder. In addition, the carbon black and the like can be used. Examples of the inorganic powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %, with respect to the total mass of the non-magnetic layer.

The non-magnetic layer can be a layer containing the non-magnetic powder and the binding agent and can further contain one or more kinds of additives. For other details of the binding agent or the additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. 1 [kOe] is $10^6/4\pi$ [A/m]. It is preferable that the non-magnetic layer does not have a residual magnetic flux density and coercivity.

Non-Magnetic Support

Next, the non-magnetic support (hereinafter, referred to as a "support") will be described. As the non-magnetic support, well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. A corona discharge, a plasma treatment, an easy-bonding treatment, or a heat treatment may be performed on these supports in advance.

Back Coating Layer

The magnetic recording medium can also include a back coating layer containing a non-magnetic powder on a surface side of the non-magnetic support opposite to the surface side on which the magnetic layer is provided. The back coating layer preferably contains any one or both of carbon black and an inorganic powder. The back coating layer can be a layer containing the non-magnetic powder and the binding agent and can further contain one or more kinds of additives. In regards to the binding agent of the back coating layer and various additives that may be randomly included therein, a well-known technology regarding the back coating layer can be applied, and a well-known technology regarding formulation of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Contact Angle

In an aspect, a contact angle with water, which is measured on the surface of the magnetic layer of the magnetic recording medium, may be 900 or more. The present inventor considers that the contact angle can be an indicator of the content of the silicon-containing compound in the portion on the magnetic layer side. In addition, the present inventor considers that it is preferable to include the silicon-containing compound in the portion on the magnetic layer side in an amount such that the contact angle is 90° or more in order to further reduce the friction coefficient after repeated running and to further suppress the change in surface shape of the magnetic layer before and after repeated running.

In the present invention and the present specification, the contact angle with water, which is measured on the surface of the magnetic layer, is obtained by the following method. In the present invention and the present specification, the "magnetic layer surface (surface of the magnetic layer)" has the same meaning as a surface of the magnetic recording medium on a magnetic layer side.

Measurement of Contact Angle

The contact angle is obtained by a θ/2 method by dropwise adding water onto a measurement point on the magnetic layer surface of the magnetic recording medium to be measured in a measurement environment of an atmosphere temperature of 20° C., and a relative humidity of 25%. An example of measurement conditions will be described below in the section of Examples. The measurement point is set to six points randomly selected on the magnetic layer surface, and the contact angle is measured at each of the six points. An arithmetic average of the six measured values thus obtained is defined as the contact angle with water, which is measured on the surface of the magnetic layer of the magnetic recording medium to be measured.

The contact angle of the magnetic recording medium is preferably 900 or more, and may be 950 or more or 100° or more. From the viewpoint of maintaining the strength of the magnetic layer, the contact angle of the magnetic recording medium is preferably 120° or less, more preferably 115° or less, and still more preferably 110° or less. A unit "°" of the angle is also written as degree.

The contact angle of the magnetic recording medium can be controlled by the amount of the silicon-containing compound used for manufacturing the magnetic recording medium. In addition, the contact angle of the magnetic recording medium can be controlled by the amount of use of a nitrogen-containing raw material polymer and a silicon-containing raw material compound capable of forming the nitrogen-containing polymer having the partial structure represented by Formula 1 in a manufacturing step of the magnetic recording medium.

Various Thicknesses

A thickness of the non-magnetic support is, for example, 3.0 to 80.0 μm, preferably 3.0 to 20.0 μm, more preferably 3.0 to 10.0 μm, and still more preferably 3.0 to 6.0 μm.

A thickness of the magnetic layer can be optimized according to saturation magnetization amount of the magnetic head used, a head gap length, a recording signal band, and the like. The thickness of the magnetic layer is preferably 10 nm to 150 nm, and is more preferably 20 nm to 120 nm, and even more preferably 30 nm to 100 nm from a viewpoint of realization of high-density recording. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 3.0 μm, preferably 0.1 to 2.0 μm, and more preferably 0.1 to 1.5 μm.

A thickness of the back coating layer is preferably 0.9 μm or less and more preferably in a range of 0.1 to 0.7 μm.

Thicknesses of each layer and the non-magnetic support of the magnetic recording medium can be obtained by a well-known film thickness measurement method. As an example, a cross section of the magnetic recording medium in a thickness direction is exposed by well-known means such as an ion beam or a microtome, and then the exposed cross section observation is performed using a scanning electron microscope or transmission electron microscope, for example. In the cross section observation, various thicknesses can be obtained as a thickness obtained at any one portion of the cross section, or an arithmetic average of thicknesses obtained at a plurality of portions of two or more portions, for example, two portions which are randomly extracted. Alternatively, the thickness of each layer may be obtained as a designed thickness calculated under the manufacturing conditions.

Manufacturing Method of Magnetic Recording Medium

A step of preparing a composition for forming the magnetic layer, as well as the optional non-magnetic layer and back coating layer, can usually include at least a kneading step, a dispersing step, and, as necessary, a mixing step provided before and after these steps. Each step may be divided into two or more stages. Components used in the preparation of the composition for forming each layer may be added at the beginning or during any step. In addition, each raw material may be separately added in two or more steps. As described above, one or more kinds of nitrogen-containing raw material polymers and one or more kinds of the nitrogen-containing raw material compounds are used as components of the composition for forming a magnetic layer, and these are mixed in a step of preparing the composition for forming a magnetic layer to form the nitrogen-containing polymer having the partial structure represented by Formula 1. In addition, in one aspect, the composition for forming a magnetic layer can be prepared by mixing one or more kinds of nitrogen-containing raw material polymers and one or more kinds of the nitrogen-containing raw material compounds to form the nitrogen-containing polymer having the partial structure represented by Formula 1 before preparation of the composition for forming a magnetic layer, and then using the polymer as a component of the composition for forming a magnetic layer. This point also applies to a step of preparing the composition for forming a non-magnetic layer. In order to prepare a composition for forming each layer, a well-known technology can be used. In the kneading step, an open kneader, a continuous kneader, a pressure kneader, or a kneader having a strong kneading force such as an extruder is preferably used. Details of the kneading treatment are described in JP1989-106338A (JP-H01-106338A) and JP1989-79274A (JP-H01-79274A). In addition, in order to disperse the composition for forming each layer, one or more kinds of dispersion beads selected from the group consisting of glass beads and other dispersion beads can be used as a dispersion medium. As such dispersion beads, zirconia beads, titania beads, and steel beads which are dispersion beads having a high specific gravity are suitable. These dispersion beads may be used by optimizing a particle diameter (bead diameter) and a filling percentage of the dispersion beads. As a dispersing device, a well-known dispersing device can be used. The composition for forming each layer may be filtered by a well-known method before performing the coating step. The filtering can be performed by using a filter, for example. As the filter used in the filtering, a filter having a pore diameter of 0.01 to 3 μm (for example, filter made of glass fiber or filter made of polypropylene) can be used, for example.

The magnetic layer can be formed through a step of directly applying the composition for forming a magnetic layer onto the non-magnetic support surface or performing multilayer applying of the composition for forming a magnetic layer with the composition for forming a non-magnetic layer sequentially or simultaneously. The back coating layer can be formed through a step of applying a composition for forming a back coating layer onto a surface of the non-magnetic support opposite to the surface having the magnetic layer (or to be provided with the magnetic layer).

After the coating step, various treatments such as a drying treatment, an alignment treatment of the magnetic layer, and a surface smoothing treatment (calendering treatment) can be performed. For the coating step and the various treatments, a well-known technology can be applied, and for example, descriptions disclosed in paragraphs 0051 to 0057 of JP2010-24113A can be referred to. For example, as the alignment treatment, a vertical alignment treatment can be performed. The vertical alignment treatment can be performed by a well-known method such as a method using a polar opposing magnet. In the alignment zone, a drying speed of the coating layer can be controlled depending on a temperature of dry air and an air volume and/or a transportation speed of the magnetic recording medium in the alignment zone. Further, the coating layer may be preliminarily dried before the transportation to the alignment zone.

It is possible to form a servo pattern in the magnetic recording medium manufactured as described above by a well-known method in order to enable tracking control of the magnetic head in the magnetic recording and reproducing device, control of a running speed of the magnetic recording medium, and the like. The term "formation of servo pattern" can also be referred to as "recording of servo signal". The magnetic recording medium may be a tape-shaped magnetic recording medium (magnetic tape) or may be a disk-shaped magnetic recording medium (magnetic disk). Hereinafter, the formation of the servo patterns will be described using a magnetic tape as an example.

The servo pattern is usually formed along a longitudinal direction of the magnetic tape. Examples of control (servo control) systems using a servo signal include a timing-based servo (TBS), an amplitude servo, and a frequency servo.

As shown in a european computer manufacturers association (ECMA)-319, a magnetic tape conforming to a linear tape-open (LTO) standard (generally referred to as an "LTO tape") employs a timing-based servo system. In this timing-based servo system, the servo pattern is formed by continuously arranging a plurality of pairs of non-parallel magnetic stripes (also referred to as "servo stripes") in the longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo signal continuous in the longitudinal direction of the magnetic tape. A plurality of the servo bands are usually provided on the magnetic tape. For example, in an LTO tape, the number of the servo bands is five. Regions interposed between two adjacent servo bands are referred to as data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) arranged continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

Ahead for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

Magnetic Tape Cartridge

Another aspect of the present invention relates to a magnetic tape cartridge including the tape-shaped magnetic recording medium (that is, the magnetic tape).

The details of the magnetic tape included in the above magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing device for recording and/or reproducing data on the magnetic tape, the magnetic tape is pulled out of the magnetic tape cartridge to be wound around the reel on the magnetic recording and reproducing device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing device side. During this time, data is recorded and/or reproduced as the magnetic head and the surface on the magnetic layer side of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be any of single reel type magnetic tape cartridge or dual reel type magnetic tape cartridge. The above magnetic tape cartridge need only include the magnetic tape according to one aspect of the present invention, and the well-known technology can be applied to the others.

Magnetic Recording and Reproducing Device

Still another aspect of the present invention relates to a magnetic recording and reproducing device including the magnetic recording medium.

In the present invention and the present specification, the term "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be, for example, a sliding type magnetic recording and reproducing device. The sliding type magnetic recording and reproducing device is a device in which the surface on the magnetic layer side and the magnetic head come into contact with each other to be slid on each other, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic recording medium, and can also be a reproducing head capable of performing the reproducing of data recorded on the magnetic recording medium. In addition, in one aspect, the magnetic recording and reproducing device can include both a recording head and a reproducing head as separate magnetic heads. In another aspect, the magnetic head included in the magnetic recording and reproducing device can have a configuration in which both an element for recording data (recording element) and an element for reproducing data (reproducing element) are included in one magnetic head. Hereinafter, the element for recording data and the element for reproducing are collectively referred to as "elements for data". As the reproducing head, a magnetic head (MR head) including a magnetoresistive (MR) element capable of sensitively reading data recorded on the magnetic recording medium as a reproducing element is preferable. As the MR head, various well-known MR heads such as an Anisotropic Magnetoresistive (AMR) head, a Giant Magnetoresistive (GMR) head, or a Tunnel Magnetoresistive (TMR) head can be used. In addition, the magnetic head which performs the recording of data and/or the reproducing of data may include a servo signal reading element. Alternatively, as a head other than the magnetic head which performs the recording of data and/or the reproduction of data, a magnetic head (servo head) comprising a servo signal reading element may be included in the magnetic recording and reproducing device. For example, a magnetic head that records data and/or reproduces recorded data (hereinafter also referred to as "recording and reproducing head") can include two servo signal reading elements, and the two servo signal reading elements can simultaneously read two adjacent servo bands. One or a plurality of elements for data can be disposed between the two servo signal reading elements.

In the magnetic recording and reproducing device, recording of data on the magnetic recording medium and/or reproducing of data recorded on the magnetic recording medium can be performed, for example, as the surface of the magnetic recording medium on the magnetic layer side and the magnetic head come into contact with each other to be slid on each other. The magnetic recording and reproducing device need only include the magnetic recording medium according to one aspect of the present invention, and a well-known technology can be applied to the others.

For example, in a case of recording data and/or reproducing recorded data, first, tracking using the servo signal is performed. That is, by causing the servo signal reading element to follow a predetermined servo track, the element for data is controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

EXAMPLES

Hereinafter, an aspect of the present invention will be described based on Examples. Here, the present invention is not limited to aspects shown in Examples. Unless otherwise noted, "parts" and "%" in the following description indicate "parts by mass" and "mass %". "eq" is an equivalent and is a unit that cannot be converted into an SI unit.

The following various steps and operations were performed in an environment of a temperature of 20° C. to 25° C., and a relative humidity of 40% to 60%, unless otherwise noted.

Ferromagnetic Powder

In Examples and Comparative Examples, the following hexagonal strontium ferrite was used as the ferromagnetic powder.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above and including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle containing the pulverized material, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an in-furnace temperature of 110° C. for 6 hours to obtain a hexagonal strontium ferrite powder.

An average particle size of the hexagonal strontium ferrite powder obtained above was 18 nm, an activation volume was 902 $nm^3$, an anisotropy constant Ku was $2.2\times10^5$ $J/m^3$, and a mass magnetization as was 49 $A\cdot m^2/kg$.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector

Soller slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

An activation volume and an anisotropy constant Ku of the above hexagonal strontium ferrite powder are values obtained by the method described above using a vibrating sample magnetometer (manufactured by Toei Industry Co., Ltd.) for each ferromagnetic powder.

In addition, a mass magnetization σs is a value measured at a magnetic field intensity of 1194 kA/m (15 kOe) using a vibrating sample magnetometer (manufactured by Toei Industry Co., Ltd.).

Synthesis of Polymer Having Constitutional Unit Represented by Formula 2 Hereinafter, a monomer containing a silicon atom is referred to as "monomer a", and other monomers are referred to as "monomer b". Each of the polymers P-1 to P-4 shown above was synthesized by the method described below. The fact that the polymers P-1 to P-4 were synthesized was confirmed from results of both nuclear magnetic resonance (NMR) analysis of $^{1}$H-NMR and $^{13}$C-NMR.

Synthesis of Polymer P-1

15.0 g of cyclohexanone was put into a 200 mL three-neck flask equipped with a stirrer, a cooling pipe, a nitrogen introduction pipe, and a thermometer, and the inside was substituted with nitrogen at an internal temperature of 80° C. A mixed solution of 30.0 g of the monomer K-1 (X-22-2404 manufactured by Shin-Etsu Chemical Co., Ltd.) shown above as the monomer a, 0.2 g of dimethyl 2,2'-azobis (isobutyrate) (manufactured by FUJIFILM Wako Pure Chemical Corporation), and 30.0 g of cyclohexanone was added dropwise over 3 hours. A mixed solution of 0.2 g of dimethyl 2,2'-azobis(isobutyrate) and 2.5 g of cyclohexanone was added thereto, the mixture was stirred at an internal temperature of 90° C. for 3 hours, and then 22.5 g of cyclohexanone was added thereto to obtain a polymer P-1.

Synthesis of Polymer P-2

A polymer P-2 was synthesized in the same manner as described above for the synthesis of the polymer P-1, except that the monomer K-1 was replaced with the monomer K-1 (monomer a) and the methacrylic acid (monomer b) shown above. Table 1 below shows a mixing ratio (molar ratio) of the monomer a and the monomer b. In Table 1, the values described in the columns of "a" and "b" are mixing ratios (molar ratios).

Synthesis of Polymer P-3

A polymer P-3 was synthesized in the same manner as described above for the synthesis of the polymer P-1, except that the monomer K-1 was replaced with the monomer K-1 (monomer a) and 2-aminoethyl methacrylate (monomer b). Table 1 below shows a mixing ratio (molar ratio) of the monomer a and the monomer b.

Synthesis of Polymer P-4

A polymer P-4 was synthesized in the same manner as described above for the synthesis of the polymer P-1, except that the monomer K-1 was replaced with the monomer K-1 (monomer a) and 2-hydroxyethyl methacrylate (monomer b). Table 1 below shows a mixing ratio (molar ratio) of the monomer a and the monomer b.

Synthesis of Comparative Polymer Having No Partial Structure Represented by Formula 1

Synthesis of Comparative Polymer R-1

A comparative polymer R-1 was synthesized in the same manner as that described above for the synthesis of the polymer P-1, except that the monomer K-1 was replaced with a monomer r-1 shown below.

r-1

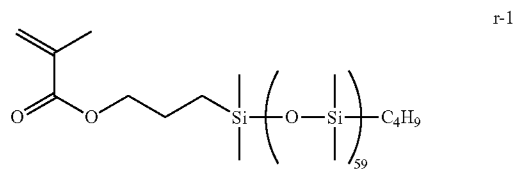

R-1 is a homopolymer including a constitutional unit shown below, and is a polymer having no partial structure represented by Formula 1.

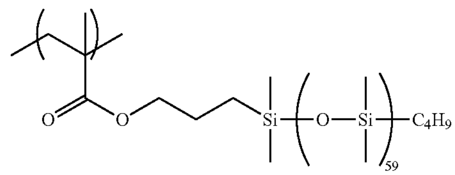

Synthesis of Nitrogen-Containing Polymer (Polyalkyleneimine-Based Polymer) Having Partial Structure Represented by Formula 1

Synthesis of Polyalkyleneimine-Based Polymer Q-1

In a 500 mL three-neck flask, 16.8 g of n-octanoic acid (manufactured by FUJIFILM Wako Pure Chemical Corporation) as carboxylic acid, 100 g of F-caprolactone (PLACCEL M manufactured by Daicel Corporation) as a lactone, 2.2 g of monobutyltin oxide (manufactured by FUJIFILM Wako Pure Chemical Corporation) ($C_4H_9Sn(O)OH$) as a catalyst were mixed, and the mixture was heated at a temperature of 160° C. for 1 hour. 100 g of F-caprolactone was added dropwise thereto over 5 hours, and the mixture was further stirred for 2 hours. Thereafter, the mixture was cooled to room temperature to obtain polyester (i-1). The number of units of the repeating unit of the lactone, which was calculated from a raw material preparation ratio, was 15. The number of units of the lactone repeating unit corresponds to b11 in Formula 11 or b21 in Formula 12.

2.4 g of polyethylenimine (SP-006 manufactured by Nippon Shokubai Co., Ltd., number-average molecular weight: 600), 95 g of the polyester (i-1), and 5.0 g of the compound S-1 (siloxane carboxylic acid) shown above were mixed, and the mixed liquid was heated at a temperature of 110° C. for 3 hours to obtain a polyalkyleneimine-based polymer Q-1. For the obtained polyalkyleneimine-based polymer Q-1, it was confirmed that a polymer having the following constitutional unit was obtained from results of both nuclear magnetic resonance (NMR) analysis of $^{1}$H-NMR and $^{13}$C-NMR.

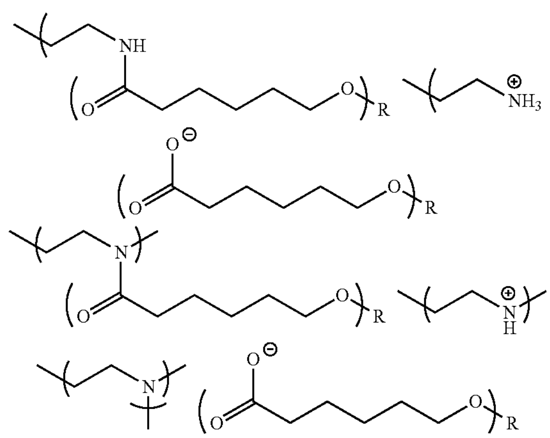

R = $COC_7H_{15}$

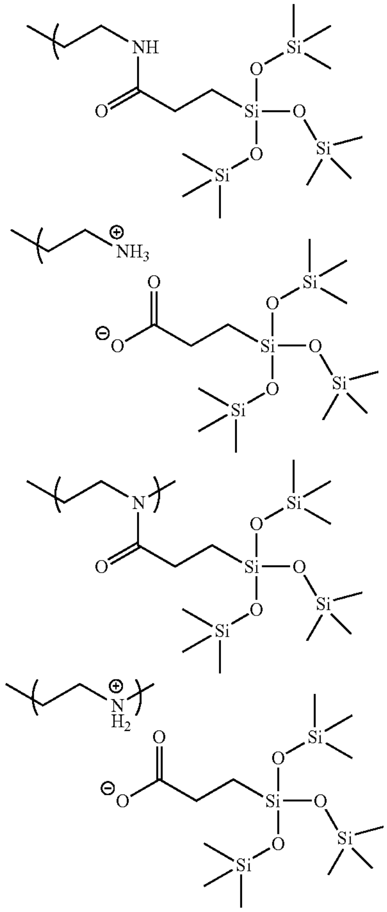

Synthesis of Polyalkyleneimine-Based Polymer Q-2

A polyalkyleneimine-based polymer Q-2 was synthesized in the same manner as described above for the synthesis of the polyalkyleneimine-based polymer Q-1, except that the compound S-1 was replaced with the compound S-2 (siloxane carboxylic acid) shown above. For the obtained polyalkyleneimine-based polymer Q-2, it was confirmed that a polymer having the following constitutional unit was obtained from results of both NMR analysis of $^{1}H$-NMR and $^{13}C$-NMR. It was confirmed from an acid value of each of the polymers Q-1 and Q-2 that the salt crosslinking structure shown below was formed in the polymers Q-1 and Q-2. The oxidation was measured by the following method. The measured acid value was a value shown in Table 2 below.

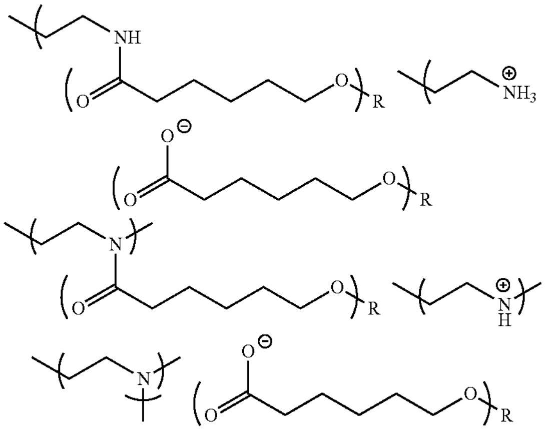

R = $COC_7H_{15}$

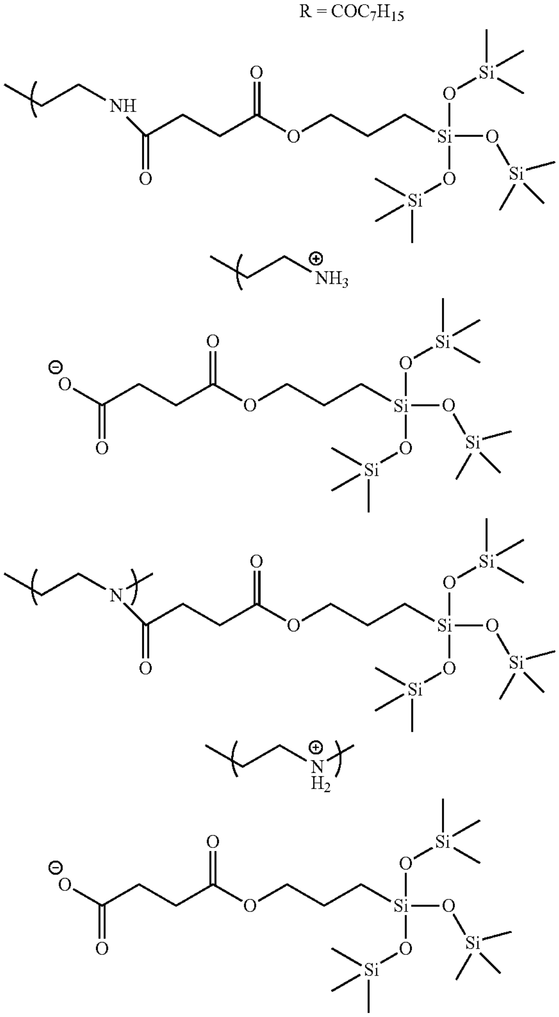

Measuring Method of Acid Value

The acid value (the number of millimoles of potassium hydroxide required to neutralize 1 g of a sample) was measured by a potential difference method (solvent: tetrahydrofuran/water=100/10 (volume ratio), titration solution: 0.01 N (0.01 mol/L) potassium hydroxide).

The weight-average molecular weight and the number-average molecular weight shown in the above or in the tables below are values measured by GPC under the following measurement conditions with standard polystyrene conversion.

Measurement Conditions of Weight-Average Molecular Weights of Polymers P-1 to P-4 and Polyester (i-1)

Measuring instrument: HLC-8220 GPC (manufactured by Tosoh Corporation)

Column: TSKgel Super HZ 2000/TSKgel Super HZ 4000/TSKgel Super HZ-H (manufactured by Tosoh Corporation)

Eluent: tetrahydrofuran (THF)

Flow rate: 0.35 mL/min

Column temperature: 40° C.

Detector: Differential refractive index (RI) detector

Measurement Conditions of Weight-Average Molecular Weight of Polymers Q-1 and Q-2 and Number-Average Molecular Weight of Polyethyleneimine Measuring instrument: HLC-8320 GPC (manufactured by Tosoh Corporation)

Column: 3 pieces of TSKgel Super AWM-H (manufactured by Tosoh Corporation)

Eluent: N-methyl-2-pyrrolidone (added 10 mM lithium bromide as an additive)

Flow rate: 0.35 mL/min

Column temperature: 40° C.

Detector: RI detector

A polyalkyleneimine-based polymer A shown below is a polyalkyleneimine-based polymer synthesized in the same manner as described above for the synthesis of the polyalkyleneimine-based polymer Q-1, except that 100 g of the polyester (i-1) was used without using the compound S-1 (siloxane carboxylic acid). A weight-average molecular weight of the polyalkyleneimine-based polymer A was measured by GPC under the measurement conditions described above for the polymers Q-1 and the like with standard polystyrene conversion, and as a result, the weight-average molecular weight was 7000. For the polyalkyleneimine-based polymer A, it was confirmed that a polymer having the following constitutional unit was obtained from results of both NMR analysis of $^{1}$H-NMR and $^{13}$C-NMR.

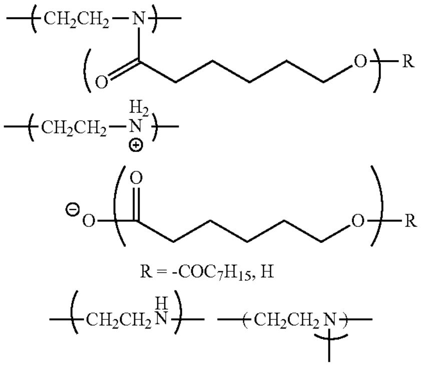

Example 1

Preparation of Composition for Forming Magnetic Layer

The following components were kneaded with an open kneader and then dispersed using a sand mill.

Ferromagnetic powder: 100.0 parts

Polyalkyleneimine-based polymer A: 10.0 parts

Polyurethane resin: (VYLON (registered trademark) UR4800, manufactured by Toyobo Co., Ltd., functional group: $SO_3Na$, functional group concentration: 70 eq/ton): 4.0 parts Vinyl chloride resin (MR104 manufactured by Kaneka Corporation): 10.0 parts Methyl ethyl ketone: 150.0 parts Cyclohexanone: 150.0 parts $\alpha$-$Al_2O_3$ (average particle size: 0.1 μm): 6.0 parts Carbon black (average particle size: 20 nm): 0.7 parts The following components were added to the dispersion liquid obtained above, and the mixture was stirred and then subjected to an ultrasonic treatment, and filtered using a filter having a pore diameter of 1 μm, thereby preparing a composition for forming a magnetic layer.

Polymer P-1: 1.5 parts

Stearic acid: 1.5 parts

Butyl stearate: 0.5 parts

Stearic acid amide: 0.3 parts

Methyl ethyl ketone: 110.0 parts

Cyclohexanone: 110.0 parts

Polyisocyanate compound (CORONATE 3041 manufactured by Tosoh Corporation): 3.0 parts Preparation of Composition for Forming Non-Magnetic Layer The following components were kneaded with an open kneader and then dispersed using a sand mill. The obtained dispersion liquid was filtered using a filter having a pore diameter of 1 μm to prepare a composition for forming a non-magnetic layer.

Carbon black: 100.0 parts

Dibutyl phthalate (DBP) oil absorption: 100 mL/100 g pH: 8

Brunauer-emmett-teller (BET) specific surface area: 250 $m^2/g$

Volatile content percentage: 1.5%

Polyurethane resin (VYLON UR4800, manufactured by Toyobo Co., Ltd., functional group: $SO_3Na$, functional group concentration: 70 eq/ton): 20.0 parts Vinyl chloride resin (functional group: $OSO_3K$, functional group concentration: 70 eq/ton): 30.0 parts Trioctylamine: 4.0 parts Cyclohexanone: 140.0 parts Methyl ethyl ketone: 170.0 parts Stearic acid amide: 0.3 parts Toluene: 3.0 parts Polyisocyanate compound (CORONATE 3041 manufactured by Tosoh Corporation): 5.0 parts Preparation of Composition for Forming Back Coating Layer The following components were pre-kneaded with a roll mill and then dispersed with a sand mill. To the obtained dispersion liquid, 4.0 parts of a polyester resin (VYLON500 manufactured by Toyobo Co., Ltd.), 14.0 parts of a polyisocyanate compound (CORONATE 3041 manufactured by Tosoh Corporation), and 5.0 parts of $\alpha$-$Al_2O_3$ (manufactured by Sumitomo Chemical Co., Ltd.) were added and stirred, and then filtered, thereby preparing a composition for forming a back coating layer.

Carbon black (average particle size: 40 nm): 85.0 parts
Carbon black (average particle size: 100 nm): 3.0 parts
Nitrocellulose: 28.0 parts
Polyurethane resin: 58.0 parts
Copper phthalocyanine-based dispersing agent: 2.5 parts
NIPPOLLAN 2301 (manufactured by Tosoh Corporation.): 0.5 parts
Methyl isobutyl ketone: 0.3 parts
Methyl ethyl ketone: 860.0 parts
Toluene: 240.0 parts Manufacture of Magnetic Recording Medium Both surfaces of a biaxially stretched polyethylene naphthalate support having a thickness of 5.0 μm were subjected to a corona discharge treatment.

The composition for forming a non-magnetic layer was applied onto one surface of the polyethylene naphthalate support such that the thickness of the non-magnetic layer after drying was 1.0 μm, and immediately after that, the composition for forming a magnetic layer was applied thereonto such that the thickness of the magnetic layer after drying was 100 nm. After performing a vertical alignment treatment using a cobalt magnet having a magnetic force of 0.5 T (tesla) and a solenoid having a magnetic force of 0.4 T while both layers were in a wet state, a drying treatment was performed. Thereafter, the composition for forming a back coating layer was applied onto the other surface of the polyethylene naphthalate support such that the thickness of the back coating layer after drying was 0.5 m, and then a calendering treatment was performed at a surface temperature of a calender roll of 100° C., and a speed of 80 m/min with a 7-stage calender configured of metal rolls. Thereafter, the layer was slit to have a width of ½ inches (1 inch is 0.0254 meters) to manufacture a magnetic tape.

Examples 2 to 6 and Comparative Examples 1 and 2

A magnetic tape was manufactured by the method described in Example 1, except that the polymer P-1 was changed to the polymers shown in Table 1 or Table 2 below.

Evaluation Method

Contact Angle

For each of the magnetic tapes of Examples and Comparative Examples, the contact angle was obtained by the method described above. Specifically, the contact angle was obtained by the following method.

A sample piece having a length of 30 cm was cut out from each of the magnetic tapes of Examples and Comparative Examples.

The contact angle of the magnetic layer surface of the sample piece with respect to water was measured by a contact angle measuring device (contact angle measuring device DropMaster 700 manufactured by Kyowa Interface Science Co., Ltd.) by the following method. The contact angle was measured in a measurement environment of an atmosphere temperature of 20° C., and a relative humidity of 25%.

The sample piece was placed on a slide glass such that the back coating layer surface was in contact with the slide glass surface. 2.0 μL of a measurement liquid (water) was added dropwise onto the surface of the sample piece (magnetic layer surface), and after visually confirming that the added liquid formed stable liquid droplets, a liquid droplet image was analyzed by a contact angle analysis software FAMAS attached to the contact angle measuring device, and the contact angle of the liquid droplet with the sample piece was measured. The contact angle was calculated by a θ/2 method. The measurement point was set to six points randomly selected on the magnetic layer surface, and the contact angle was measured at each of the six points. An arithmetic average of the six measured values obtained as described above was defined as a contact angle of the magnetic tape to be measured.

Method: liquid droplet method (θ/2 method)
Droplet landing recognition: automatic
Droplet landing recognition line (distance from needle tip): 50 dots
Algorithm: automatic
Image mode: frame
Threshold hold level: automatic Frictional Property In an environment controlled to an atmosphere temperature of 13° C., and a relative humidity of 80%, a magnetic head detached from a linear tape-open generation 7 (LTO (registered trademark) G7) drive manufactured by IBM Corporation was attached to a tape running system, and a magnetic tape having a tape length of 20 m was repeatedly run (10000 cycles of running) at 4.0 m/see while performing feeding from a feeding roll and winding around a winding roll with an applied tension of 0.6 N.

In the first cycle of running and the 10000th cycle of running, the frictional force applied to the magnetic head during running was measured using a strain gauge, and the friction coefficient μ value was obtained from the measured frictional force. The friction coefficient after repeated running was evaluated from the measured value according to the following evaluation standard. Evaluation results A or B are preferable, and A is most preferable.

Evaluation Standard

A: μ value was less than 0.08.
B: μ value was 0.08 or more and 0.12 or less.
C: μ value was more than 0.12.

Reduction Rate of 5 nm Protrusion (Evaluation of Change in Surface Shape of Magnetic Layer Before and After Repeated Running)

For each of the magnetic tapes of Examples and Comparative Examples, the number of protrusions having a height of 5 nm or more on the magnetic layer surface was obtained by the following method for the unrunning magnetic tape and the magnetic tape after the repeated running in the above environment.

The number of protrusions having a height of 5 nm or more was obtained by measurement using an atomic force microscope (AFM). Specifically, in a plane image of the magnetic layer surface obtained using the AFM, a plane where a volume of protruding components and a volume of recess components in the measurement region are equal to each other was defined as a reference plane, and the number of protrusions having a height of 5 nm or more from the reference plane was obtained. Among the protrusions which have a height of 5 nm or more and are present in the measurement region, there may be protrusions of which a part is inside the measurement region and the other part is outside the measurement region. In a case of obtaining the number of protrusions, the number of protrusions was measured including such protrusions.

The measurement region in the measurement using the AFM was taken as a region of 5 μm square (5 μm×5 μm) on the magnetic layer surface. The measurement was performed for three different measurement regions on the magnetic layer surface (n=3). The number of protrusions having a height of 5 nm or more was obtained as an arithmetic average of three values obtained through such measurement. The following measurement conditions were employed as measurement conditions of the AFM.

A region of 5 μm square (5 μm×5 μm) on the surface of the magnetic layer of the magnetic tape was measured using an AFM (Nanoscope 4 manufactured by Veeco Instruments, Inc.) in a tapping mode. RTESP-300 manufactured by BRUKER was used as a probe, a resolution was set to 512 pixels×512 pixels, and a scan speed was set to a speed at which one screen (512 pixels×512 pixels) was measured in 341 seconds.

The change in surface shape of the magnetic layer before and after the repeated running was evaluated according to the following evaluation standard from the protrusion reduction rate calculated by the following expression. It can be determined that, as the value of the protrusion reduction rate is smaller, the change in surface shape of the magnetic layer before and after the repeated running is suppressed.

Protrusion reduction rate (%)=[(number of protrusions obtained for unrunning magnetic tape)−(number of protrusions obtained for magnetic tape after the above-described repeated running)/(number of protrusions obtained for unrunning magnetic tape)]×100

Evaluation Standard

A: The protrusion reduction rate was 40% or less.

B The protrusion reduction rate was more than 40 and less than 70.

C: The protrusion reduction rate was 7000 or more.

The above results are shown in Tables 1 and 2.

TABLE 1

| | Polymer | | | | | | Reduction rate of 5 nm protrusion |
|---|---|---|---|---|---|---|---|
| | Type | a | b | Weight-average molecular weight | Contact angle | Frictional property | |
| Example 1 | P-1 | 100 | 0 | 26400 | 90° | B | A 30% |
| Example 2 | P-2 | 90 | 10 | 17800 | 105° | A | A 20% |
| Example 3 | P-3 | 90 | 10 | 6700 | 95° | A | A 25% |
| Example 4 | P-4 | 90 | 10 | 2400 | 90° | B | A 20% |
| Comparative Example 1 | None | — | — | — | 80° | C | C 70% |
| Comparative Example 2 | R-1 | — | — | — | 85° | C | B 50% |

TABLE 2

| | Polymer | | | | | |
|---|---|---|---|---|---|---|
| | Type | Weight-average molecular weight | Acid value (mmol/g) | Contact angle | Frictional property | Reduction rate of 5 nm protrusion |
| Example 5 | Q-1 | 7000 | 0.42 | 90° | B | A 30% |
| Example 6 | Q-2 | 6600 | 0.37 | 95° | A | A 25% |

Example 7

A magnetic tape was manufactured by the method described in Example 1, except that, instead of using 10.0 parts of the polymer P-1, 2.0 parts of the polyalkyleneimine-based polymer A was used as the nitrogen-containing raw material polymer and 0.5 parts of the compound S-1 (siloxane carboxylic acid) shown above was used as the silicon-containing raw material compound. The obtained magnetic tape was evaluated by the method described above.

Example 8

A magnetic tape was manufactured by the method described in Example 7, except that the compound S-1 was replaced with the compound S-2 (siloxane carboxylic acid) shown above. The obtained magnetic tape was evaluated by the method described above.

The above results are shown in Table 3.

TABLE 3

| | Nitrogen-containing raw material polymer | Silicon-containing raw material compound | Contact angle | Frictional property | Reduction rate of 5 nm protrusion |
|---|---|---|---|---|---|
| Example 7 | Polyalkyleneimine-based polymer A | S-1 | 95° | A | A 30% |
| Example 8 | Polyalkyleneimine-based polymer A | S-2 | 100° | A | A 30% |

From the results shown in Tables 1 to 3, it can be confirmed that the magnetic tapes of Examples 1 to 8 have a low friction coefficient after the repeated running and have a small change in surface shape of the magnetic layer before and after the repeated running.

An aspect of the present invention is useful in the technical field of a magnetic recording medium for high density recording.

What is claimed is:

1. A magnetic recording medium comprising:

a non-magnetic support; and a magnetic layer containing a ferromagnetic powder, wherein a silicon-containing compound having a partial structure represented by Formula 1 is included in a portion on the non-magnetic support on a magnetic layer side, in Formula 1, $R^{11}$, $R^{12}$, and $R^{13}$ each independently represent a monovalent substituent, $L^{11}$ represents an (n+1)-valent linking group, n represents an integer of 2 or more, and * represents a position at which the partial structure represented by Formula 1 is bonded to another partial structure constituting the silicon-containing compound:

(Formula 1)

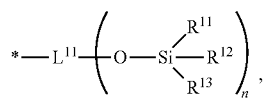

wherein the silicon-containing compound is a polymer having a constitutional unit represented by Formula 2 below, in Formula 2, $R^{21}$ and $R^{22}$ each independently represent a hydrogen atom or an alkyl group, $R^{23}$ represents a hydrogen atom or a monovalent substituent, $L^{12}$ represents a single bond or a divalent linking group, * represents a position at which the constitutional unit represented by Formula 2 is bonded to another partial structure constituting the silicon-containing compound, and $R^{11}$, $R^{12}$, $R^{13}$, $L^{11}$, and n are respectively synonymous with $R^{11}$, $R^{12}$, $R^{13}$, $L^{11}$, and n in Formula 1

(Formula 2)

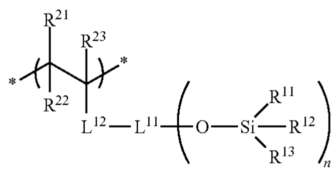

wherein the polymer having a constitutional unit represented by Formula 2 comprises one or more functional groups selected from the following group 1 in a constitutional unit other than the constitutional unit represented by Formula 2, and the group 1 consists of a carboxy group, an amino group, a hydroxy group, a sulfo group, a phosphonoxy group, and salts thereof, an alkyl group, a glycol structure, an ester structure, an amide structure, an anionic structure, and an amphoteric structure.

2. The magnetic recording medium according to claim 1, wherein, in Formula 2, $R^{21}$ and $R^{22}$ represent a hydrogen atom, and $R^{23}$ represents a hydrogen atom or a methyl group.

3. The magnetic recording medium according to claim 1, wherein the constitutional unit represented by Formula 2 is a constitutional unit represented by Formula 3, in Formula 3, $R^{23}$ represents a hydrogen atom or a methyl group, * represents a position at which the constitutional unit represented by Formula 3 is bonded to another partial structure constituting the silicon-containing compound, and $R^{11}$, $R^{12}$, $R^{13}$, $L^{11}$, and n are respectively synonymous with $R^{11}$, $R^{12}$, $R^{13}$, $L^{11}$, and n in Formula 1:

(Formula 3)

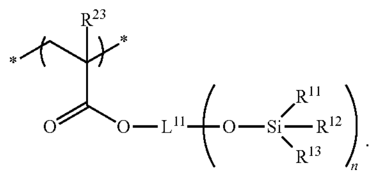

4. The magnetic recording medium according to claim 1, wherein a weight-average molecular weight of the polymer is 2000 or more and less than 200000.

5. The magnetic recording medium according to claim 3, wherein the polymer includes at least one selected from the group consisting of a carboxy group, an amino group, a hydroxy group, a sulfo group, a phosphonoxy group, and salts thereof, an ester structure, and an amide structure, and a weight-average molecular weight of the polymer is 2000 or more and less than 200000.

6. The magnetic recording medium according to claim 1, wherein the silicon-containing compound is a nitrogen-containing polymer.

7. The magnetic recording medium according to claim 6, wherein the nitrogen-containing polymer is a polyalkyleneimine-based polymer.

8. The magnetic recording medium according to claim 6, wherein the nitrogen-containing polymer has a polyester chain.

9. The magnetic recording medium according to claim 6, wherein a weight-average molecular weight of the nitrogen-containing polymer is 4000 or more and less than 20000.

10. The magnetic recording medium according to claim 1, wherein a contact angle with water, which is measured on a surface of the magnetic layer, is 90° or more.

11. The magnetic recording medium according to claim 1, wherein the portion on the non-magnetic support on the magnetic layer side further includes one or more fatty acid compounds selected from the group consisting of a fatty acid, a fatty acid ester, and a fatty acid amide.

12. The magnetic recording medium according to claim 1, further comprising:

a non-magnetic layer containing a non-magnetic powder between the non-magnetic support and the magnetic layer.

13. The magnetic recording medium according to claim 1, further comprising:

a back coating layer containing a non-magnetic powder on a surface side of the non-magnetic support opposite to a surface side having the magnetic layer.

14. The magnetic recording medium according to claim 1, wherein the magnetic recording medium is a magnetic tape.

15. A magnetic tape cartridge comprising:

the magnetic tape according to claim 14.

16. A magnetic recording and reproducing device comprising:

the magnetic recording medium according to claim 1.

17. The magnetic recording medium according to claim 1, wherein the constitutional unit, in which the one or more functional groups selected from the group 1 are included, is a constitutional unit represented by Formula 100:

(Formula 100)

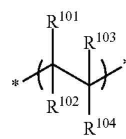

wherein in Formula 100, * represents a position at which the constitutional unit represented by Formula 100 is bonded to another partial structure constituting the silicon-containing compound, $R^{101}$ is synonymous with $R^{21}$ in Formula 2, $R^{102}$ is synonymous with $R^{22}$ in Formula 2, $R^{103}$ is synonymous with $R^{23}$ in Formula 2, and $R^{104}$ represents at least one functional group selected from the group 1 or a substituent including at least one functional group selected from the group 1.

18. The magnetic recording medium according to claim 17, wherein $R^{104}$ is a monovalent substituent represented by —C(=O)O-$L^{100}$-Z, where Z represents a group or a structure selected from the group 1, and $L^{100}$ represents a single bond or a divalent linking group.

19. The magnetic recording medium according to claim 1, wherein the polymer is at least one polymer selected from the group consisting of the following polymers P-2 to P-21 including the following constitutional units:

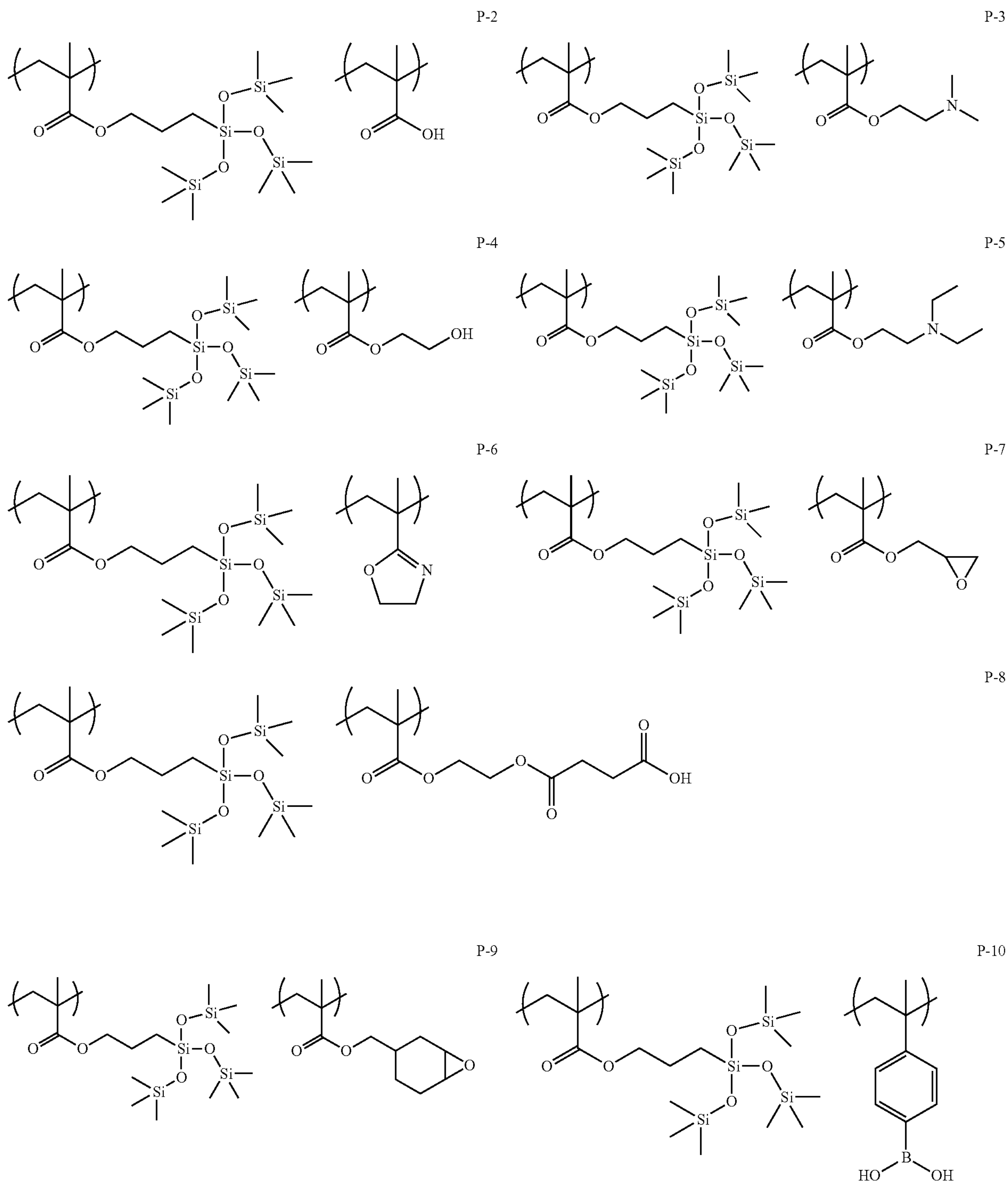

P-2

P-3

P-4

P-5

P-6

P-7

P-8

P-9

P-10

-continued
P-11
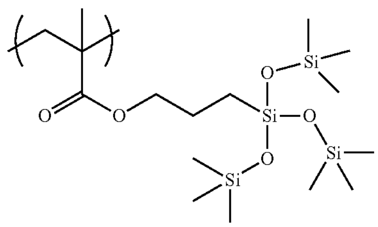 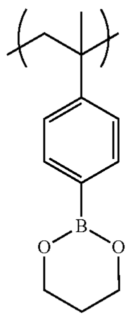
P-12
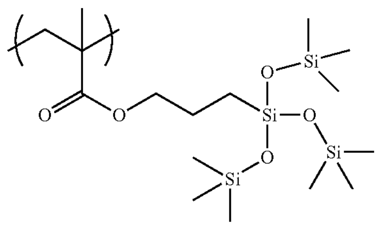 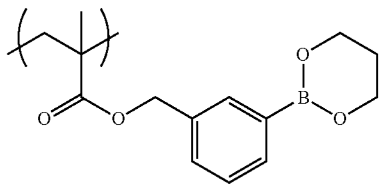
P-13
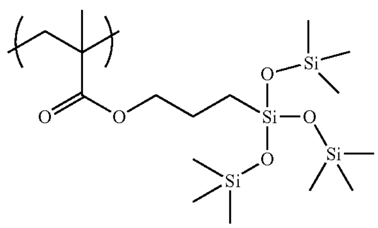 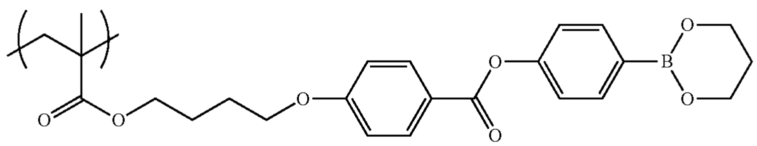
P-14
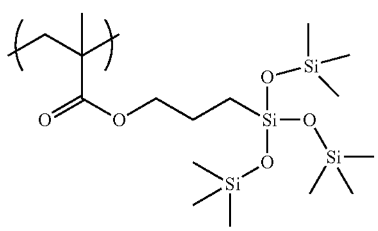 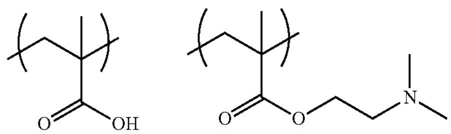
P-15
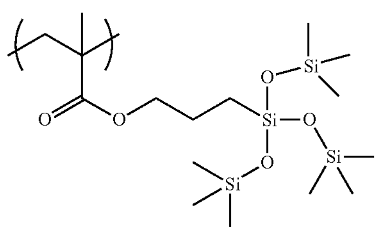 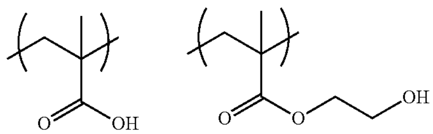
P-16
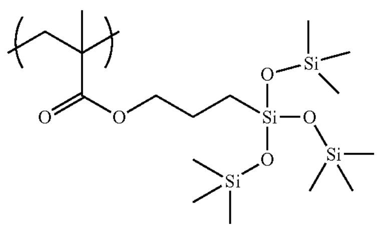 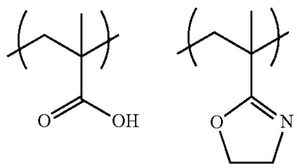

-continued
P-17
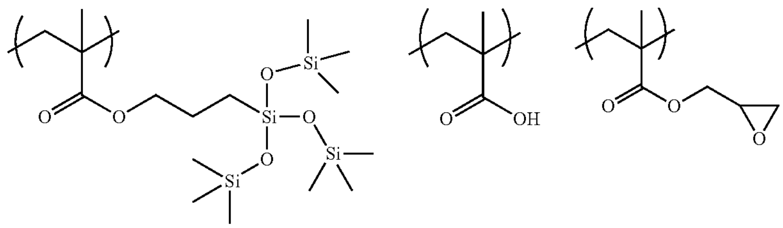
P-18
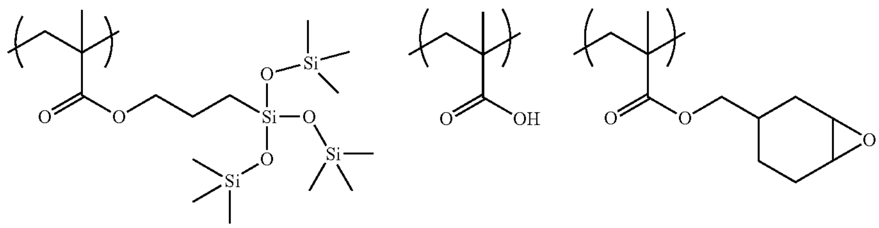
P-19
P-20
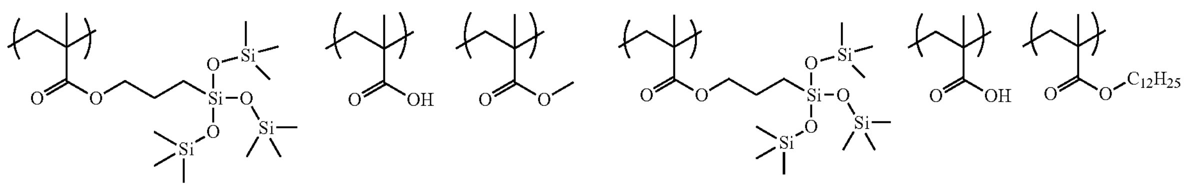
P-21
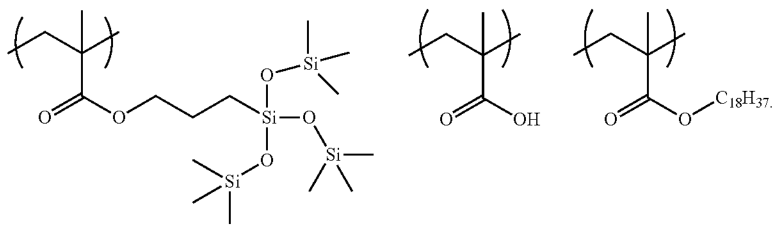
* * * * *